United States Patent
Melli et al.

(10) Patent No.: US 12,372,710 B2
(45) Date of Patent: Jul. 29, 2025

(54) METASURFACES WITH LIGHT-REDIRECTING STRUCTURES INCLUDING MULTIPLE MATERIALS AND METHODS FOR FABRICATING

(71) Applicant: Magic Leap, Inc., Plantation, FL (US)

(72) Inventors: Mauro Melli, San Leandro, CA (US); Mohammadreza Khorasaninejad, Milpitas, CA (US); Christophe Peroz, Tokyo (JP); Pierre St. Hilaire, Belmont, CA (US); Dianmin Lin, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 266 days.

(21) Appl. No.: 18/154,833

(22) Filed: Jan. 15, 2023

(65) Prior Publication Data
US 2023/0168425 A1    Jun. 1, 2023

Related U.S. Application Data

(63) Continuation of application No. 17/089,546, filed on Nov. 4, 2020, now Pat. No. 11,579,353.
(Continued)

(51) Int. Cl.
*F21V 8/00* (2006.01)
*G02B 5/18* (2006.01)
(Continued)

(52) U.S. Cl.
CPC .......... *G02B 6/0063* (2013.01); *G02B 5/1809* (2013.01); *G02B 6/0055* (2013.01);
(Continued)

(58) Field of Classification Search
CPC .......... G06T 19/006; G02B 2027/0178; G02B 27/0172; G02B 27/0093; G02B 27/01;
(Continued)

(56) References Cited

U.S. PATENT DOCUMENTS 6,850,221 B1    2/2005   Tickle
6,888,663 B2    5/2005   Bourdelais et al.
(Continued)

FOREIGN PATENT DOCUMENTS

JP    2013228688 A    11/2013
JP    2018536204 A    12/2018
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Thomas A Hollweg
*Assistant Examiner* — Mary A El-Shammaa
(74) *Attorney, Agent, or Firm* — Tobias Intellectual Property Law, PLLC

(57) ABSTRACT

Display devices include waveguides with metasurfaces as in-coupling and/or out-coupling optical elements. The metasurfaces may be formed on a surface of the waveguide and may include a plurality or an array of sub-wavelength-scale (e.g., nanometer-scale) protrusions. Individual protrusions may include horizontal and/or vertical layers of different materials which may have different refractive indices, allowing for enhanced manipulation of light redirecting properties of the metasurface. Some configurations and combinations of materials may advantageously allow for broadband metasurfaces. Manufacturing methods described herein provide for vertical and/or horizontal layers of different materials in a desired configuration or profile.

14 Claims, 22 Drawing Sheets

Related U.S. Application Data

(60) Provisional application No. 62/933,246, filed on Nov. 8, 2019.

(51) Int. Cl.
  *G02B 6/26* (2006.01)
  *G02B 27/00* (2006.01)
  *G02B 27/01* (2006.01)
  *G02B 27/09* (2006.01)
  *G06T 19/00* (2011.01)

(52) U.S. Cl.
  CPC ............ *G02B 6/0056* (2013.01); *G02B 6/26* (2013.01); *G02B 27/0093* (2013.01); *G02B 27/01* (2013.01); *G02B 27/0101* (2013.01); *G02B 27/017* (2013.01); *G02B 27/0172* (2013.01); *G02B 27/0944* (2013.01); *G06T 19/006* (2013.01); *G02B 2027/0178* (2013.01)

(58) Field of Classification Search
  CPC ............ G02B 27/0101; G02B 27/017; G02B 27/0944; G02B 6/26; G02B 6/0055; G02B 6/0056
  See application file for complete search history.

(56) References Cited

U.S. PATENT DOCUMENTS

| | | | |
|---|---|---|---|
| 11,360,306 | B2 | 6/2022 | Lin et al. |
| 2006/0028436 | A1 | 2/2006 | Armstrong |
| 2007/0081123 | A1 | 4/2007 | Lewis |
| 2011/0056398 | A1* | 3/2011 | Weiss .............. B41D 7/00 101/483 |
| 2012/0127062 | A1 | 5/2012 | Bar-Zeev et al. |
| 2012/0162549 | A1 | 6/2012 | Gao et al. |
| 2013/0082922 | A1 | 4/2013 | Miller et al. |
| 2013/0117377 | A1 | 5/2013 | Miller |
| 2013/0125027 | A1 | 5/2013 | Abovitz et al. |
| 2013/0208234 | A1 | 8/2013 | Lewis |
| 2013/0242262 | A1 | 9/2013 | Lewis et al. |
| 2014/0071539 | A1 | 3/2014 | Gao et al. |
| 2014/0072720 | A1* | 3/2014 | Watkins .............. G02B 1/118 252/521.1 |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao et al. |
| 2016/0026253 | A1 | 1/2016 | Bradski et al. |
| 2017/0010488 | A1 | 1/2017 | Klug et al. |
| 2017/0131460 | A1 | 5/2017 | Lin et al. |
| 2017/0322418 | A1* | 11/2017 | Lin .................... G02B 27/0172 |
| 2018/0081176 | A1 | 3/2018 | Olkkonen et al. |
| 2018/0231702 | A1 | 8/2018 | Lin et al. |
| 2018/0261785 | A1* | 9/2018 | Ahmed .................. H10K 59/35 |
| 2018/0299607 | A1* | 10/2018 | Menezes ............ G02B 27/0172 |
| 2018/0341090 | A1 | 11/2018 | Devlin et al. |
| 2019/0129178 | A1 | 5/2019 | Patterson et al. |
| 2019/0206136 | A1* | 7/2019 | West .................. G02B 27/0172 |
| 2019/0302358 | A1 | 10/2019 | Lin et al. |
| 2020/0033604 | A1* | 1/2020 | Schmulen ............ G02B 6/0055 |

FOREIGN PATENT DOCUMENTS

| | | |
|---|---|---|
| WO | 2018206847 A1 | 11/2018 |
| WO | 2018220269 A1 | 12/2018 |
| WO | 2018220271 A1 | 12/2018 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality-Merging Real and Virtual Worlds," 2005 https://web.media.mit.edu/raskar/book/BimberRaskarAugmentedRealityBook.pdf.

Devlin, et al., "Broadband high-efficiency dielectric metasurfaces for the visible spectrum," wwww,pnas.org/cgi/doi/10,1073/pnas, 1611740113, Jul. 19, 2016.

International Preliminary Report on Patentability for PCT Application No. PCT/US 20/58953, issued May 10, 2022.

International Search Report and Written Opinion for PCT Application No. PCT/US 20/58953, mailed Feb. 2, 2021.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Lin, D. et al., "Dielectric Gradient Metasurface Optical Elements", Science, vol. 345, Issue 6194, Jul. 18, 2014, in 6 pages.

Lin, D. et al., "Supplementary Materials for Dielectric Gradient Metasurface Optical Elements", Science, vol. 345, Issue 6194, Jul. 18, 2014, in 22 pages.

Lin, R. et al. Molecular-Scale Soft Imprint Lithography for Alignment Layers in Liquid Crystal Devices; Nano Letters, vol. 7, No. 6; Publication [online], May 23, 2007 [retrieved Feb. 7, 2018]. Retrieved from the Internet: URL:https://pubs.acs.org/doi/abs/10.1021/nl070559y; pp. 1613-1621.

Tanriverdi and Jacob, "Interacting With Eye Movements in Virtual Environments," Department of Electrical Engineering and Computer Science, Tufts University, Medford, MA—paper/Proc. Amc Chi 2000 Human Factors in Computing Systems Conference, pp. 265-272, Addison-Wesley/ACM Press (2000).

Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.

EP20885992.6 Extended European Search Report dated Dec. 11, 2023.

JP2022-525297 Office Action mailed Dec. 8, 2023.
JP2024-032848 Office Action mailed Jan. 8, 2025.

* cited by examiner

METASURFACES WITH LIGHT-REDIRECTING STRUCTURES INCLUDING MULTIPLE MATERIALS AND METHODS FOR FABRICATING

CROSS-REFERENCE TO RELATED APPLICATIONS

This application is a continuation application of U.S. patent application Ser. No. 17/089,546, filed Nov. 11, 2020, entitled "METASURFACES WITH LIGHT-REDIRECTING STRUCTURES INCLUDING MULTIPLE MATERIALS AND METHODS FOR FABRICATING," which claims the benefit of U.S. Provisional Application Ser. No. 62/933,246, filed Nov. 8, 2019, entitled "METASURFACES WITH LIGHT-REDIRECTING STRUCTURES INCLUDING MULTIPLE MATERIALS AND METHODS FOR FABRICATING," and the entirety of each of these applications is incorporated by reference herein.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

Some aspects include an optical system. The optical system comprises a waveguide and an optical element on a surface of the waveguide. The optical element is configured to redirect light having a wavelength, and comprises a plurality of spaced-apart protrusions disposed on the waveguide. Each protrusion comprises a first vertical layer comprising a first material, and a second vertical layer comprising a second material different from the first material.

The optical element may be a metasurface. The first material and the second material may have different refractive indices. The first vertical layer may define a u-shaped cross-sectional profile, wherein the second material fills an interior volume of the u-shape. Each protrusion may further comprise an intermediate vertical layer disposed between the first vertical layer and the second vertical layer, the intermediate vertical layer comprising a third material different from the first material and the second material. The intermediate vertical layer and the second vertical layer may both have u-shaped cross-sectional profiles. The plurality of protrusions may comprise at least one of nanobeams and pillars. Protrusions of the plurality of protrusions may be separated from each other by a sub-wavelength spacing. As used herein, sub-wavelength dimensions are less than the wavelength of light, preferably visible light (e.g., the visible light which the metasurface is configured to receive and redirect in a display system, as disclosed herein). The wavelength may correspond to blue light, green light, or red light.

Some aspects include a method of manufacturing an optical element for redirecting light. The method includes providing a plurality of spaced-apart placeholders on a waveguide, conformally depositing a first blanket layer comprising a first material onto the placeholder and the waveguide, preferentially removing horizontally-oriented portions of the first blanket layer to expose at least a portion of the placeholders, and selectively etching the placeholders relative to the first blanket layer to form a plurality of vertically-oriented protrusions comprising the first material. The plurality of vertically-oriented protrusions are configured to redirect light.

The vertically-oriented protrusions may form a metasurface, the vertically-oriented protrusions having a spacing less than a wavelength of the light. The vertically-oriented protrusions may comprise at least one of nanobeams and pillars. The wavelength may correspond to blue light, green light, or red light. Providing the placeholders may comprise depositing a layer of a resist on the waveguide and patterning the resist to define the placeholders. Patterning the resist may comprise performing at least one of photolithography, electron beam lithography, and nanoimprint lithography. Conformally depositing the first layer may comprise depositing the first layer by atomic layer deposition. The method may further comprise conformally depositing a second blanket layer onto the first blanket layer, the second blanket layer comprising a second material different from the first material, wherein the second blanket layer is conformally deposited prior to preferentially removing the horizontally-oriented portions. Preferentially removing horizontally-oriented portions may remove horizontally-oriented portions of the second layer and the first layer. The first blanket layer may extend along sidewalls of the placeholders to define open volumes therebetween, further comprising filling the open volumes with a fill material before preferentially removing horizontally-oriented portions. Selectively etching the placeholders may comprise retaining the fill material. The fill material may have a different refractive index than the first material. Preferentially removing horizontally-oriented portions may comprise performing chemical mechanical polishing. The method may further comprise annealing remaining portions of the first blanket layer prior to selectively etching the placeholders. Selectively etching the placeholders may comprise at least one of wet etching and plasma etching.

Some aspects include an optical system. The optical system comprises a waveguide and an optical element on a surface of the waveguide. The optical element is configured to redirect light having a wavelength, and comprises a plurality of protrusions disposed on the waveguide. Each protrusion comprises a lower horizontal layer on the waveguide, the lower horizontal layer comprising a first material; and an upper layer on the lower horizontal layer, the upper horizontal layer comprising a second material different from the first material.

The optical element may comprise a metasurface. The first material and the second material may have different refractive indices. Each protrusion may further comprise an intermediate horizontal layer disposed between the upper layer and the lower layer, the intermediate layer comprising a third material different from the first material and the second material. The plurality of protrusions may comprise at least one of nanobeams and pillars. The plurality of protrusions may be separated from each other by a sub-wavelength spacing less than the wavelength of the light. The wavelength may correspond to blue light, green light, or red light. At least one of the first material and the second material may comprise a sulfur compound. The sulfur compound may be molybdenum sulfide.

Some aspects include a method of manufacturing an optical element. The method comprises forming a metasurface, wherein forming the metasurface comprises: depositing a lower blanket layer on a waveguide, the lower blanket layer comprising a first material; depositing an upper blanket layer on the lower blanket layer, the upper blanket layer comprising a second material different from the first material; forming an etch mask over the upper blanket layer, the etch mask exposing unmasked portions of the upper blanket layer; and removing unmasked portions of the upper blanket layer and the lower blanket layer to form a plurality of protrusions comprising remaining portions of the lower and upper layers, the protrusions configured to redirect light.

The vertically-oriented protrusions may form a metasurface, the vertically-oriented protrusions having a sub-wavelength spacing less than a wavelength of the light. The vertically-oriented protrusions may comprise at least one of nanobeams and pillars. The wavelength may correspond to blue light, green light, or red light. The method may further comprise converting at least one of the lower layer and the upper layer of each protrusion to a different material by exposing the plurality of protrusions to an atmosphere comprising a chemical species for incorporation into the at least one of the lower layer and the upper layer. Converting the lower layer or the upper layer may comprise at least one of sulfurization and selenization. The lower layer and the upper layer may be deposited by at least one of physical vapor deposition, chemical vapor deposition, and atomic layer deposition. At least one of the lower layer and the upper layer may have a thickness of 5 nanometers or less. The method may further comprise depositing a third layer onto the upper layer before forming the etch mask, the third layer comprising a third material different from the first material and the second material, wherein forming the etch mask comprises forming the etch mask over the third layer.

DETAILED DESCRIPTION

Figure 1:
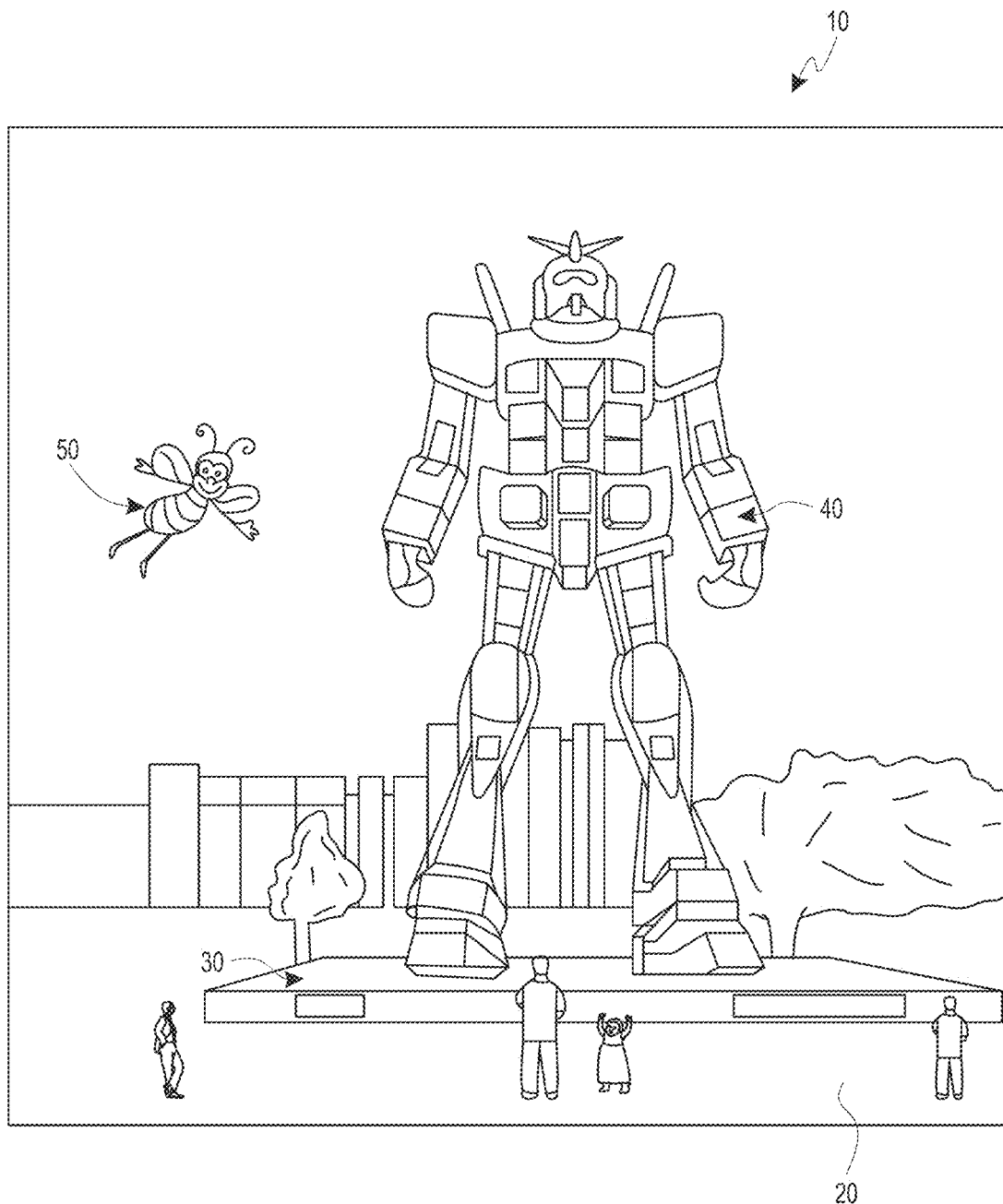
FIG. 1 illustrates a user's view of augmented reality (AR) through an AR device.

AR and/or VR systems may display virtual content to a user, or viewer. For example, this content may be displayed on a head-mounted display, e.g., as part of eyewear, that projects image information to the user's eyes. In addition, where the system is an AR system, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some display systems, one or more waveguides, such as a stack of waveguides, may be configured to form virtual images at a plurality of virtual depth planes (also referred to simply a "depth planes" herein) perceived to be at different distances away from the user. In some implementations, light containing image information may be in-coupled into a waveguide, propagate through the waveguide, and then be out-coupled (e.g., towards the eye of a viewer). Different waveguides of the stack of waveguides may have optical structures (e.g., out-coupling optical elements) that simulate the wavefront divergence of light propagating from objects to the user's eyes at different distances from the user's eye. In some implementations, as an alternative to, or in addition to waveguide optical structures for providing optical power, the display systems may also include one or more lenses that provide or additionally provide optical powers or desired amounts of wavefront divergence. Light with image information may be provided by an image source, and may be in-coupled into individual waveguides by an in-coupling optical element of each waveguide. The in-coupling and out-coupling optical elements may be a diffractive optical element, including a metasurface.

It will be appreciated that the in-coupling and out-coupling optical elements preferably meet various performance criteria to, e.g., provide good image quality and/or high power efficiency. For example, different waveguides may be configured to output light of different colors or wavelength. As result, in some implementations, the in-coupling and/or out-coupling optical elements may redirect light (in-couple or out-couple the light, respectively) with high selectivity and high efficiency for desired wavelengths, while redirecting light at low efficiency for other wavelengths. As another example, it may be desirable for the in-coupling and/or out-coupling optical elements to redirect light away from those optical elements at particular angles and/or receive incident light at particular angles for redirection. Preferably, the redirection of light of particular desired wavelengths and/or in or from particular desired directions is achieved with high-efficiency. These and various other performance parameters of meta-surfaces may be adjusting by appropriately designing the structures defining the meta-surfaces.

Advantageously, systems and methods described herein provide optical elements, such as in-coupling and/or out-coupling optical elements, which, in some implementations, allow a large amount of latitude in tuning the performance characteristics of the optical elements by allowing wide latitude in modifying properties related to the materials forming the optical elements. Metasurfaces are typically been formed of a single material. Some of the systems and methods described herein provide for individual constituent structures of a metasurface which include a plurality of materials at highly precise locations and proportions. For example, the protrusions forming a metasurface may have horizontal layers and/or vertical layers (e.g., concentric vertical layers) of different materials, e.g. materials having different refractive indices. Advantageously, the inclusion of multiple materials within individual protrusions of a metasurface may provide for greater customization in metasurface design, e.g., allowing for improved control of the scattering response (e.g., amplitude, phase shift, etc.) of metasurfaces. It will be appreciated that the meta-surfaces may form various structures providing controlled redirection or scattering of incident electromagnetic radiation, including light of visible wavelengths. In some implementations, multi-layered metasurface protrusions form broadband achromatic meta-lenses, broadband beam deflectors, broadband achromatic waveplates, broadband polarizers, and/or any other metasurface in which a similar scattering response is desired across a desired (e.g. broad) range of incident wavelengths.

Reference will now be made to the drawings, in which like reference numerals refer to like parts throughout. Unless indicated otherwise, the drawings are schematic and not necessarily drawn to scale.

Example Display Systems

Figure 2:
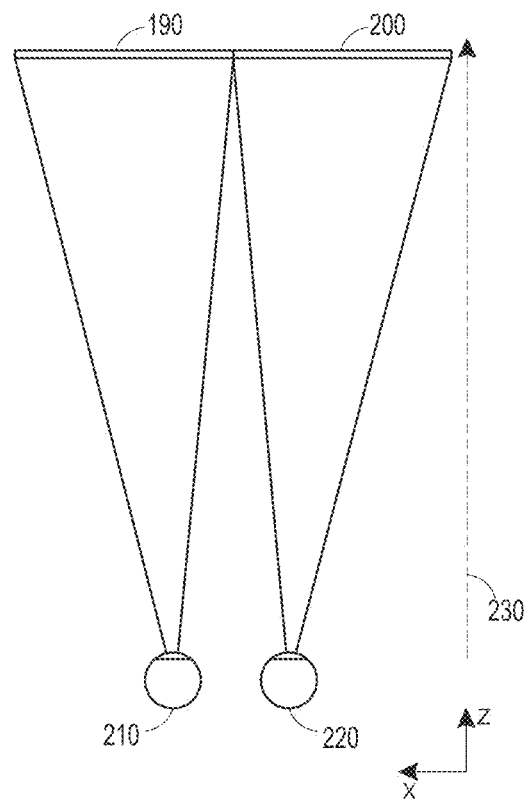
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
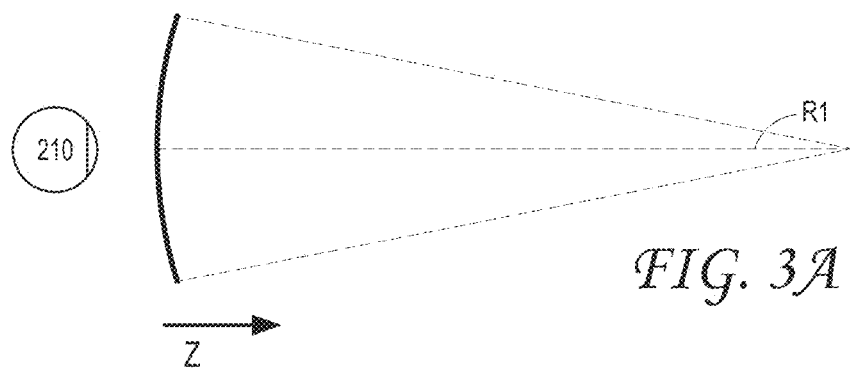
FIGS. 3A-3C illustrate relationships between radius of curvature and focal radius.
Figure 3B:
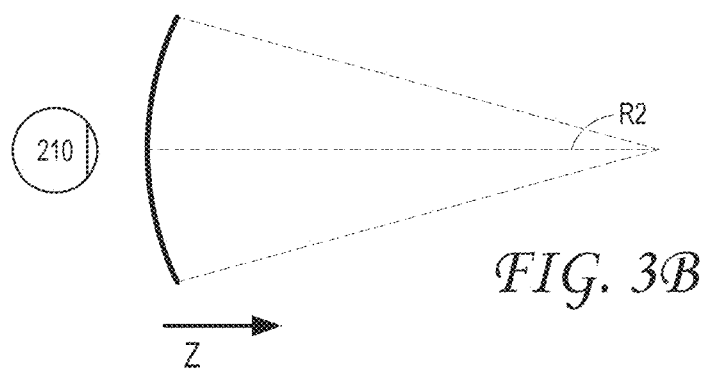
Figure 3C:
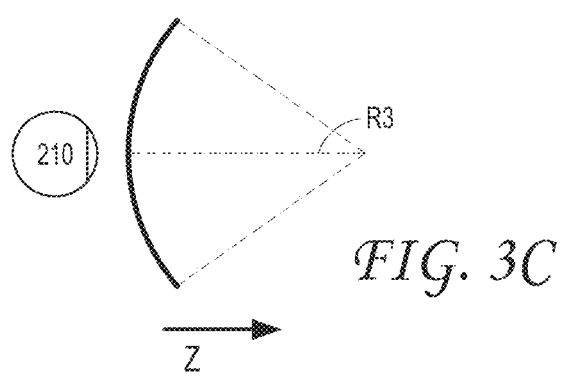

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
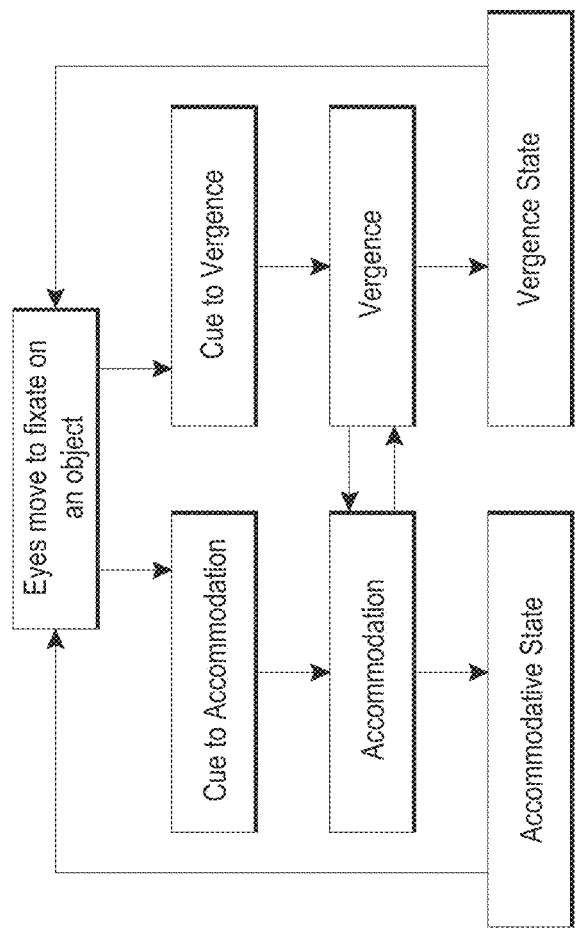
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
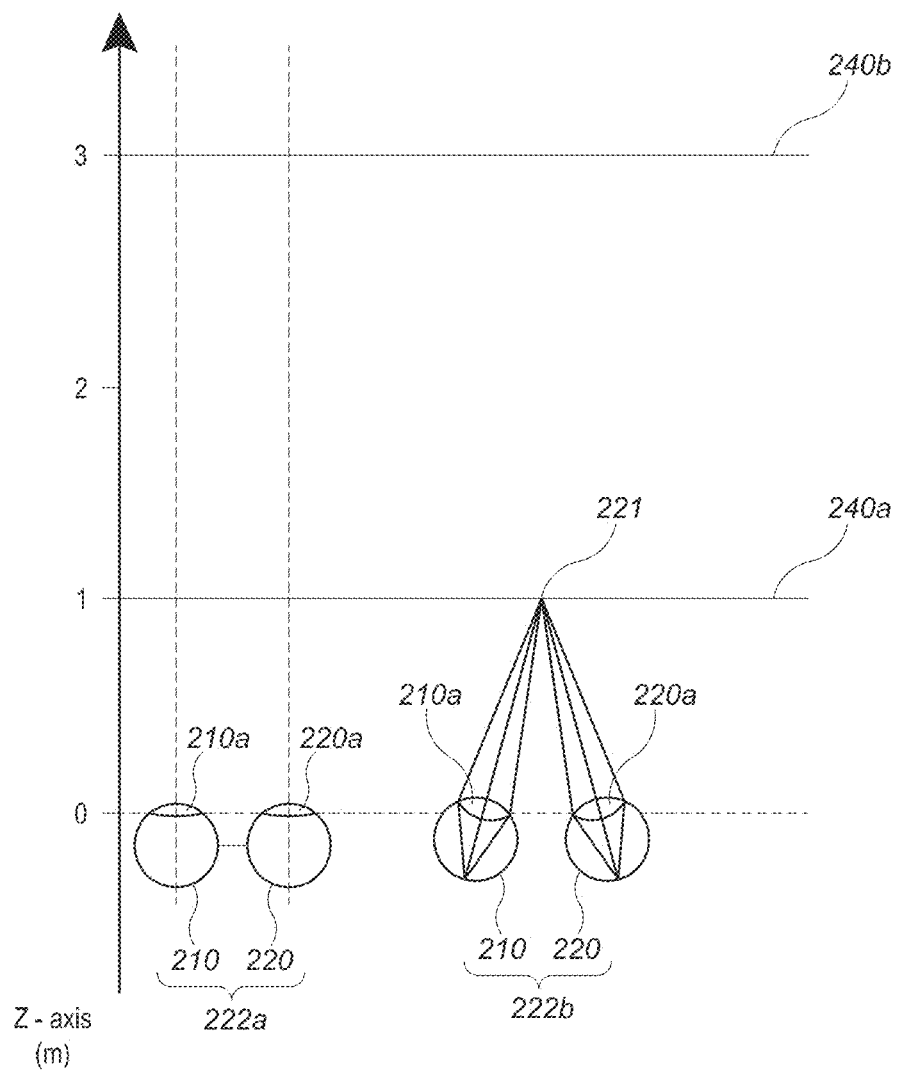
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some implementations, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated implementation, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
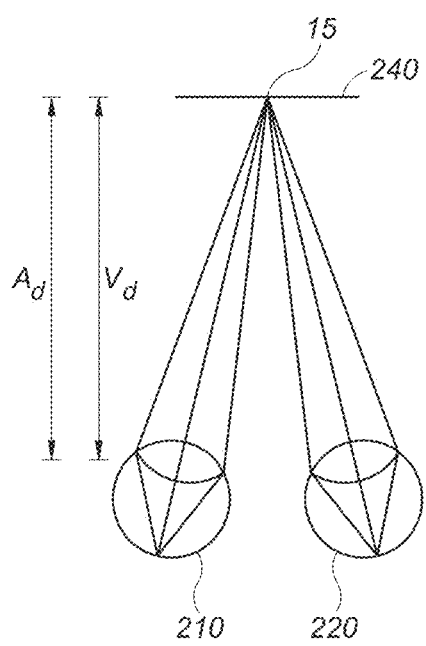
FIG. 4C illustrates an example of a representation of a top-down view of a user viewing content via a display system.
Figure 4D:
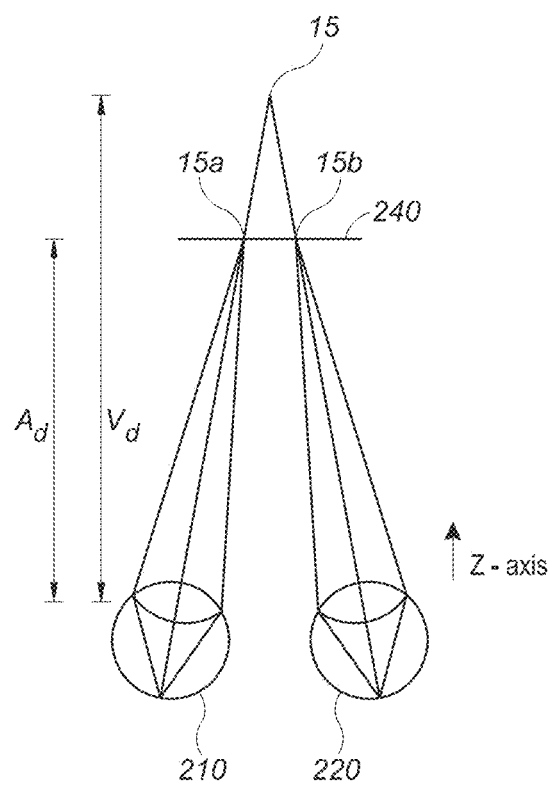
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some implementations. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$–$A_d$) and may be characterized using diopters.

In some implementations, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some implementations, display systems disclosed herein (e.g., the display system 250, FIG. 6) present images to the viewer having accommodation-vergence mismatch of about 0.5 diopter or less. In some other implementations, the accommodation-vergence mismatch of the images provided by the display system is about 0.33 diopter or less. In yet other implementations, the accommodation-vergence mismatch of the images provided by the display system is about 0.25 diopter or less, including about 0.1 diopter or less.

Figure 5:
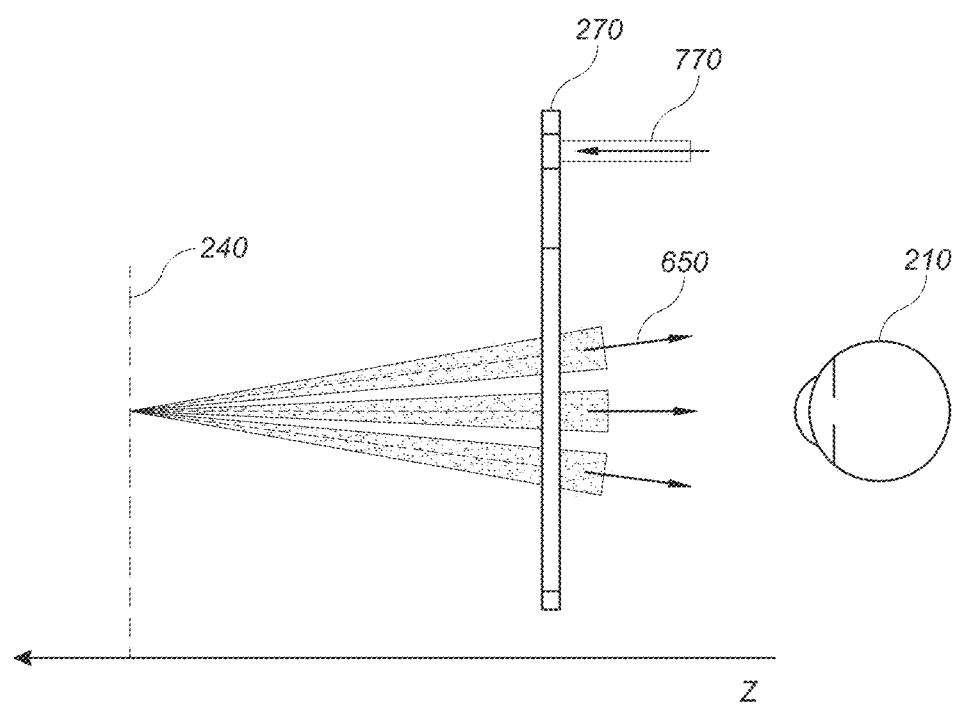
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some implementations, the same amount of wavefront divergence is provided for all objects presented on that depth plane. In addition, it will be illustrated that the other eye of the user may be provided with image information from a similar waveguide.

In some implementations, a single waveguide may be configured to output light with a set amount of wavefront divergence corresponding to a single or limited number of depth planes and/or the waveguide may be configured to output light of a limited range of wavelengths. Consequently, in some implementations, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
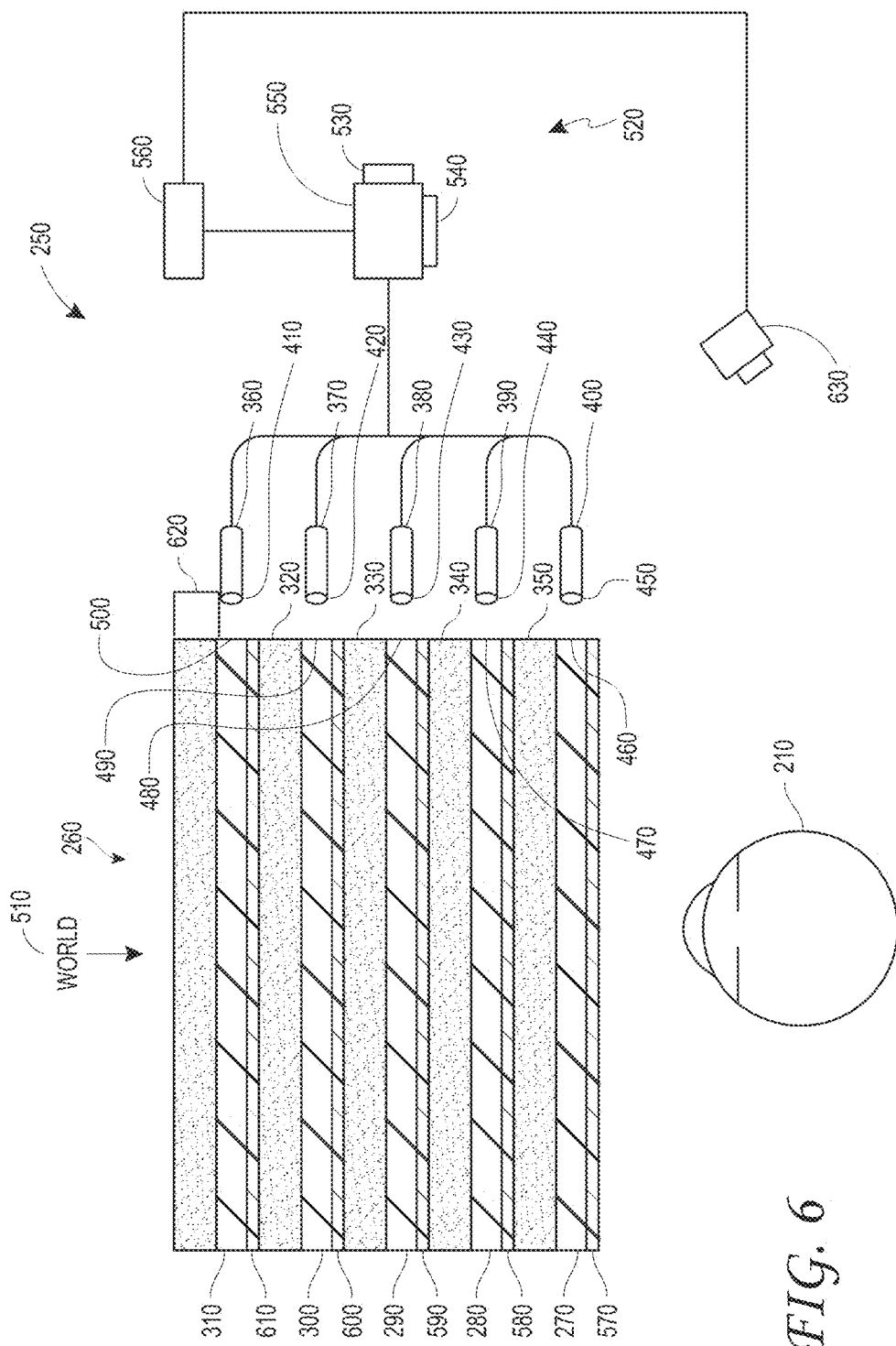
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some implementations. In addition, the waveguide assembly 260 may also be referred to as an eyepiece.

In some implementations, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some implementations, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some implementations, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some implementations, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some implementations, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some implementations, a single one of the image injection devices 360, 370, 380, 390, 400 may be associated with and inject light into a plurality (e.g., three) of the waveguides 270, 280, 290, 300, 310.

In some implementations, the image injection devices 360, 370, 380, 390, 400 are discrete displays that each produce image information for injection into a corresponding waveguide 270, 280, 290, 300, 310, respectively. In some other implementations, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some implementations, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some implementations, these image injection devices may represent different light paths and locations in a common projection system configured to output light into associated ones of the waveguides 270, 280, 290, 300, 310. In some implementations, the waveguides of the waveguide assembly 260 may function as ideal lens while relaying light injected into the waveguides out to the user's eyes. In this conception, the object may be the spatial light modulator 540 and the image may be the image on the depth plane.

In some implementations, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some implementations, the illustrated image injection devices 360, 370, 380, 390, 400 may schematically represent a single scanning fiber or a bundle of scanning fibers configured to inject light into one or a plurality of the waveguides 270, 280, 290, 300, 310. In some other implementations, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some implementations, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some implementations, the controller may be a single integral device, or a distributed system connected by wired or wireless communication channels. The controller 560 may be part of the processing modules 140 or 150 (FIG. 9D) in some implementations.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some implementations, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some implementations, the out-coupling optical elements 570, 580, 590, 600, 610 may be formed in a layer of material that is attached to a transparent substrate to form the waveguides 270, 280, 290, 300, 310. In some other implementations, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative implementations, either or both may be dynamic using electro-active features.

In some implementations, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some implementations, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some implementations, the features 320, 330, 340, 350 may not be lenses; rather, they may simply be spacers (e.g., cladding layers and/or structures for forming air gaps).

In some implementations, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some implementations, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some implementations, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some implementations, the camera assembly 630 may include an image capture device and a light source to project light (e.g., infrared light) to the eye, which may then be reflected by the eye and detected by the image capture device. In some implementations, the camera assembly 630 may be attached to the frame 80 (FIG. 9D) and may be in electrical communication with the processing modules 140 and/or 150, which may process image information from the camera assembly 630. In some implementations, one camera assembly 630 may be utilized for each eye, to separately monitor each eye.

Figure 7:
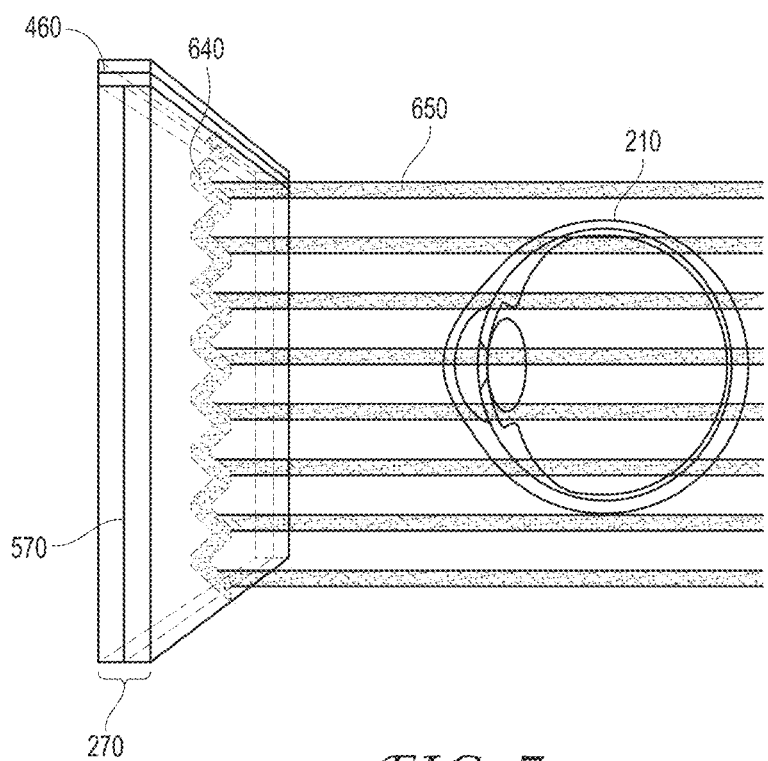
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
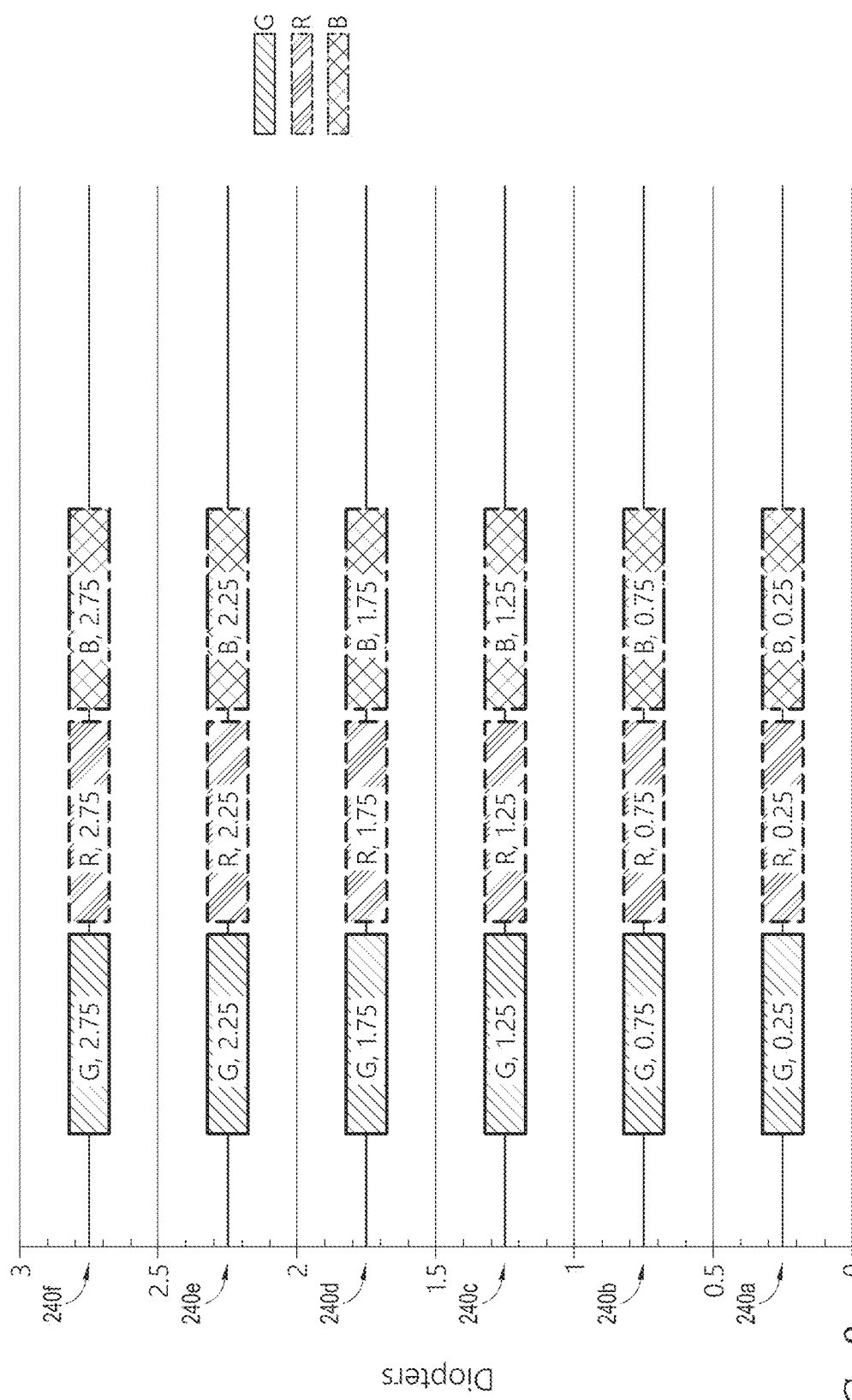
FIG. 8 illustrates an example of a stacked waveguide assembly in which each depth plane includes images formed using multiple different component colors.

In some implementations, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated implementation shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some implementations, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some implementations, light of each component color may be outputted by a single dedicated waveguide and, consequently, each depth plane may have multiple waveguides associated with it. In such implementations, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other implementations, multiple component colors may be outputted by the same waveguide, such that, e.g., only a single waveguide may be provided per depth plane.

With continued reference to FIG. 8, in some implementations, G is the color green, R is the color red, and B is the color blue. In some other implementations, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some implementations, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
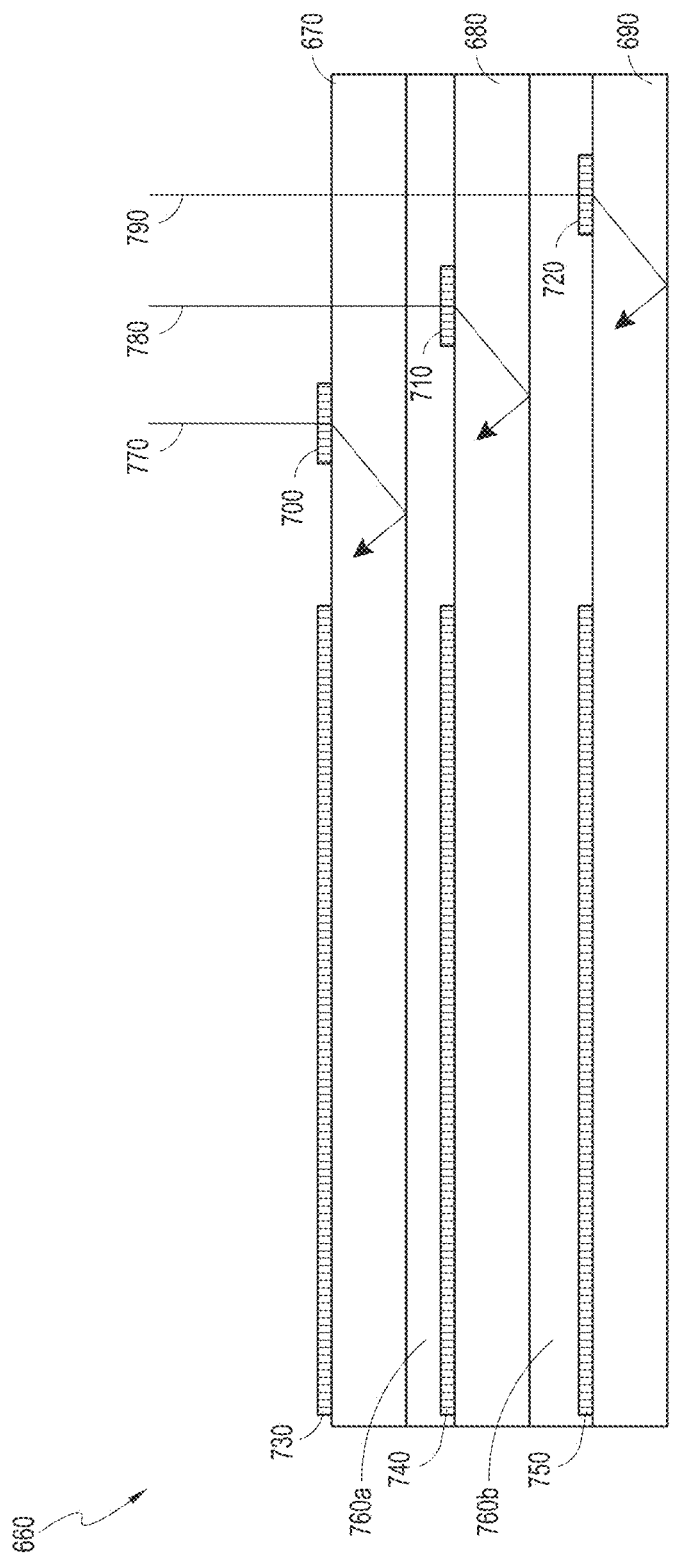
FIG. 9A illustrates a cross-sectional side view of an example of a set of stacked waveguides that each includes an in-coupling optical element.

With reference now to FIG. 9A, in some implementations, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations.

As illustrated, the in-coupling optical elements 700, 710, 720 may be laterally offset from one another. In some implementations, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some implementations, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some implementations, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some implementations, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some implementations, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
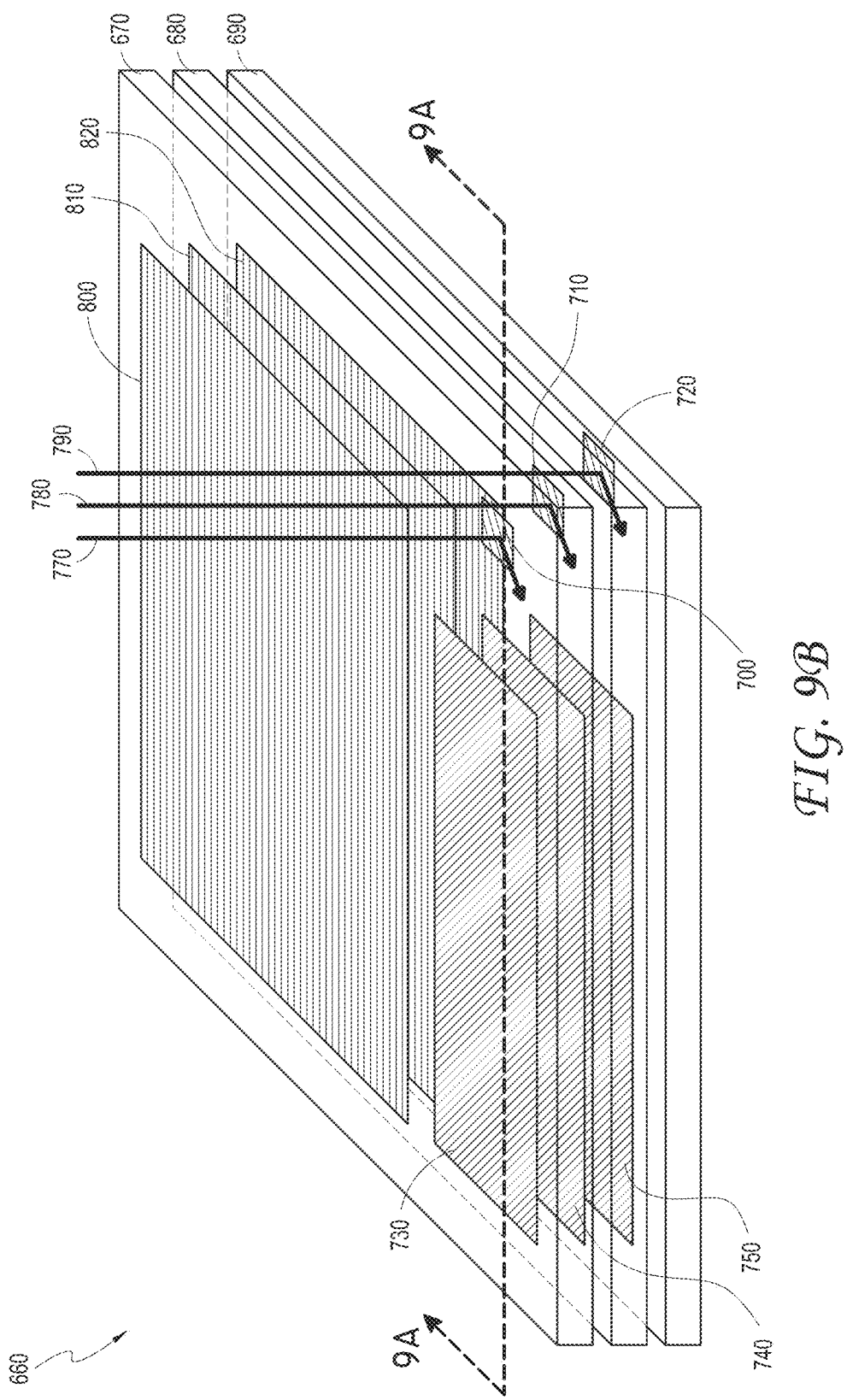
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some implementations, the OPE and/or EPE may be configured to modify a size of the beams of light.

Accordingly, with reference to FIGS. 9A and 9B, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
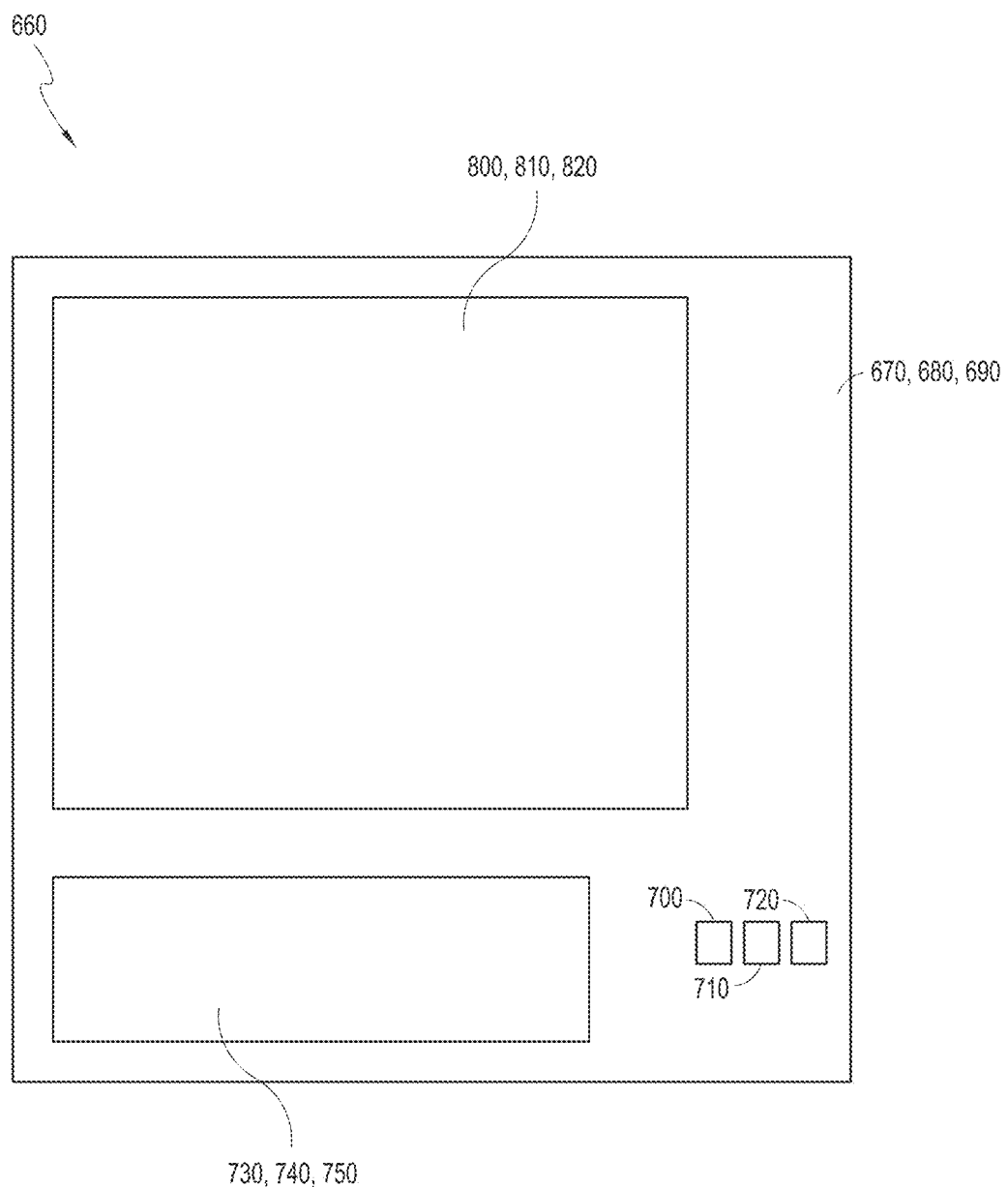
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub pupils.

Figure 9D:
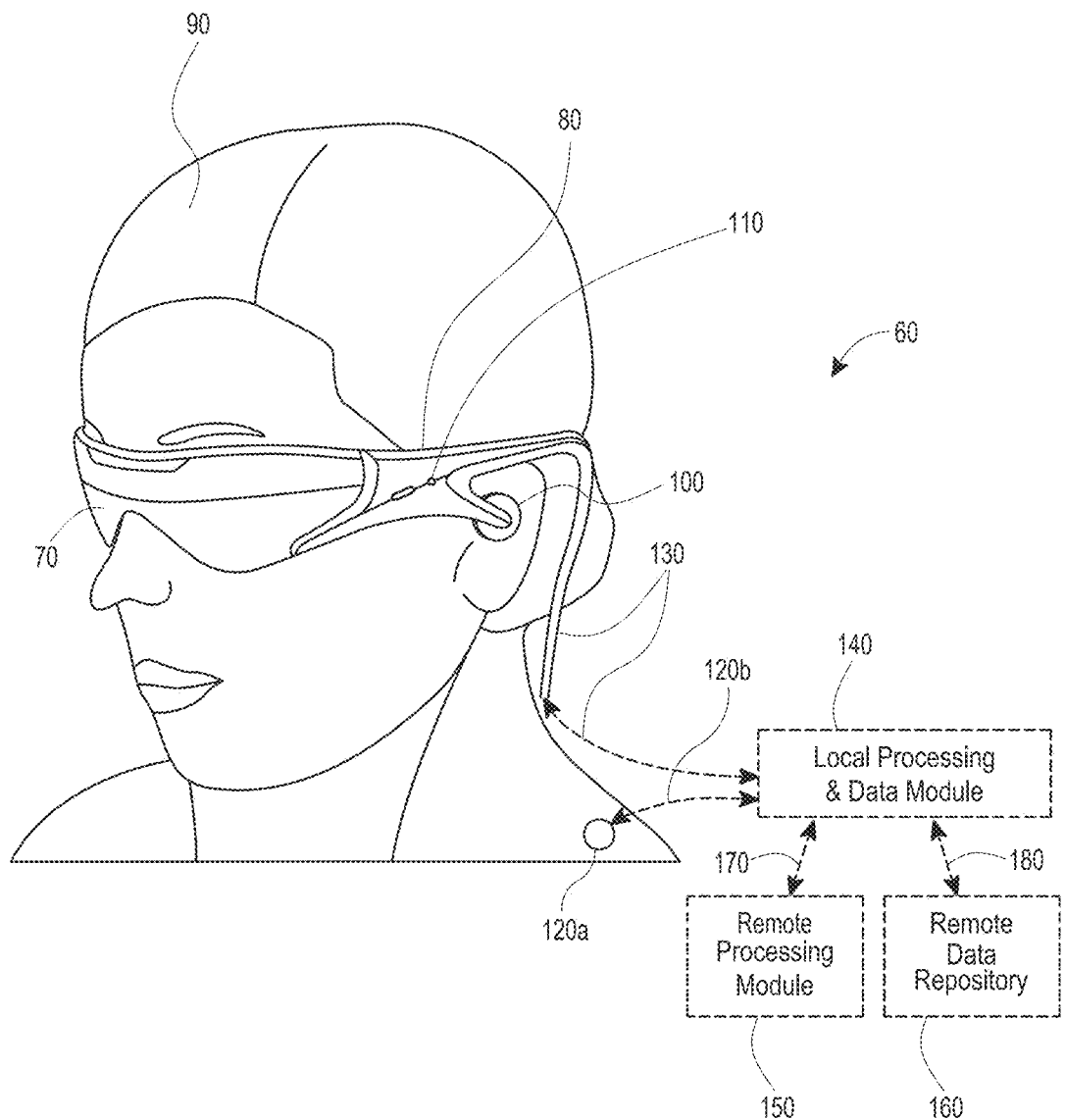
FIG. 9D illustrates an example of wearable display system.

FIG. 9D illustrates an example of wearable display system 60 into which the various waveguides and related systems disclosed herein may be integrated. In some implementations, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some implementations. In some implementations, a speaker 100 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some implementations, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some implementations. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some implementations, the local processing and data module 140 may include one or more of the image capture devices, microphones, inertial measurement units, accelerometers, compasses, GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 9D, in some implementations, the remote processing module 150 may comprise one or more processors configured to analyze and process data and/or image information, for instance including one or more central processing units (CPUs), graphics processing units (GPUs), dedicated processing hardware, and so on. In some implementations, the remote data repository 160 may comprise a digital data storage facility, which may be available through the internet or other networking configuration in a "cloud" resource configuration. In some implementations, the remote data repository 160 may include one or more remote servers, which provide information, e.g., information for generating augmented reality content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Metasurfaces

Figure 10A:
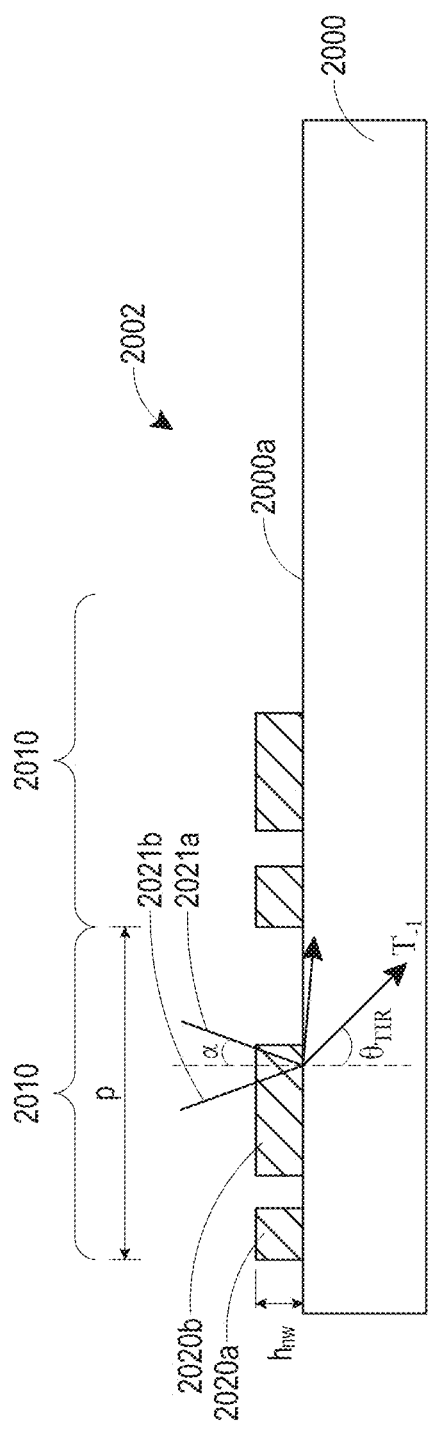
FIGS. 10A and 10B illustrate examples of cross-sectional side and top-down views, respectively, of a metasurface including a plurality of nanobeams.
Figure 10B:
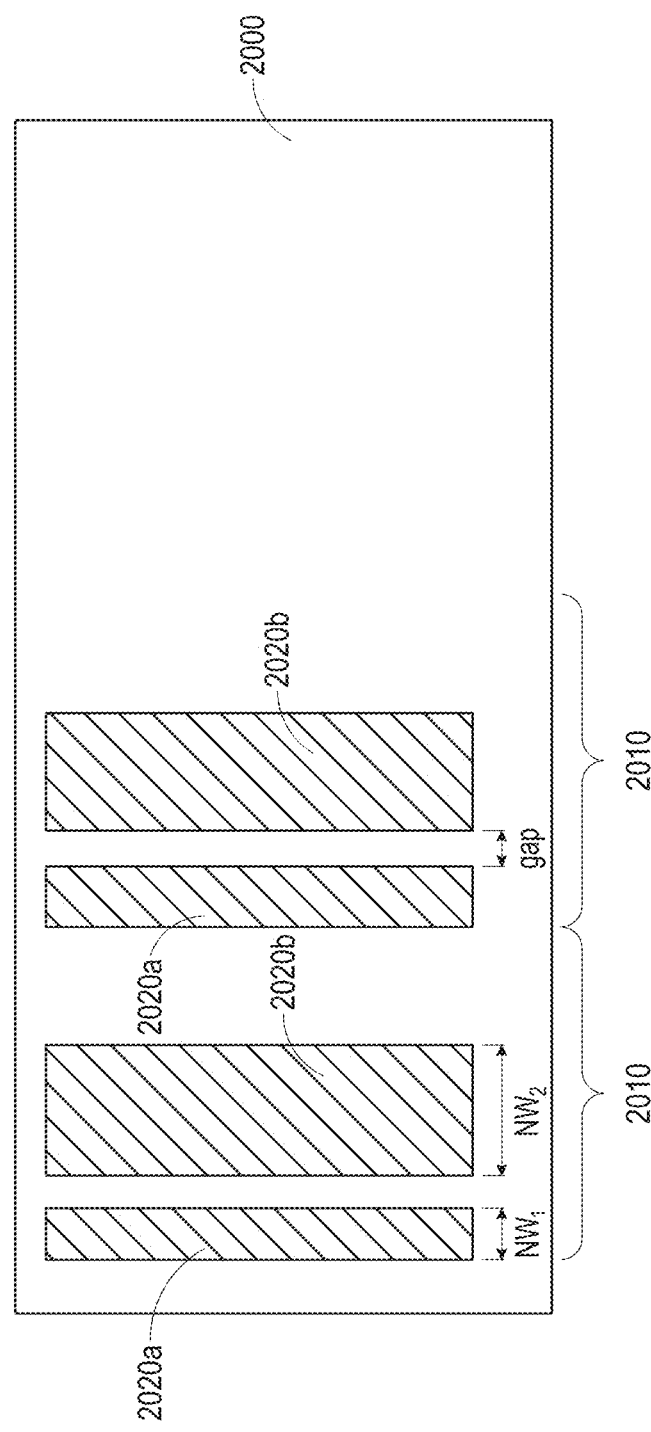

FIGS. 10A and 10B illustrate examples of cross-sectional side and top down views, respectively, of a metasurface 2002 according to some implementations. A substrate 2000 has a surface 2000a on which a metasurface 2002 comprising a plurality of metasurface unit cells 2010 is disposed. The unit cells 2010 each include one or more protrusions, comprising material extending upwards from the surface 2000a. As illustrated, in some implementations, the unit cells 2010 include two protrusions 2020a, 2020b. In some implementations, the protrusions 2020a, 2020b may take the form of free-standing pillars. In some other implementations, the protrusions 2020a, 2020b may take the form of nanobeams that are laterally-elongated. Where the units cells 2010 include two or more protrusions, the protrusions 2020a, 2020b may differ in size (e.g., one may be wider than the other), as illustrated. The protrusions 2020a, 2020b may be formed of an optically transmissive material.

With continued reference to FIG. 10A, the protrusions 2020a, 2020b may be ridges (or nanobeams), which are laterally elongated into and out of the page and define trenches between neighboring protrusions. In some implementations, the protrusions 2020a, 2020b may be linear. In some implementations, the protrusions 2020a, 2020b are continuous along their lengths, which may have benefits for providing a high diffraction efficiency. In some other implementations, the protrusions 2020a, 2020b may be discontinuous along their lengths, e.g., the protrusions 2020a, 2020b may each extend along a line, with gaps in the protrusions 2020a, 2020b along those lines.

The unit cells 2010 may repeat at regular intervals across the surface 2000a, and may be parallel to one another such that the protrusions 2020a, 2020b are also parallel to one another. The unit cells 2010 may have a width P, which is the distance between identical points of directly neighboring unit cells 2010. In some implementations, P may be in the range of 10 nm to 1 μm, including 10 nm to 500 nm or 300 nm to 500 nm. It will be appreciated that P may be considered to be the pitch of the unit cells 2010 and may be substantially constant across a grating formed by those unit cells. In some other implementations, P may vary across the surface 2000a.

Preferably, the refractive index of the material forming the protrusions 2020a, 2020b is different (e.g., higher) than the refractive index of the substrate 2000. In some implementations, protrusions 2020a, 2020b or other structures (e.g., pillars or other shapes) may include a plurality of materials having different refractive indices, some of which may individually be higher or lower than the refractive index of the substrate 2000. In some implementations, the substrate 2000 may be a waveguide, and may correspond to the waveguides 270, 280, 290, 300, 310 (FIG. 6) and/or waveguides 670, 680, and 690 (FIG. 9A). In such applications, the substrate preferably has a relatively high refractive index, e.g., 1.5, 1.6, 1.7, 1.8, 1.9, or higher, which can provide benefits for increasing the field of view of a display that forms an image by outputting light from that substrate 2000. Examples of materials for forming the substrate 2000 include glass (e.g., doped glass), lithium niobate, plastic, a polymer, sapphire, or other optically transmissive material. In some implementations, the refractive index of the material forming the protrusions 2020a, 2020b (or an effective refractive index where the protrusions 2020a, 2020b or other nanostructures include a plurality of materials) may be 2.0 or higher, 2.5 or higher, 3.0 or higher, 3.3 or higher, or 3.5 or higher. Examples of materials for forming the protrusions 2020a, 2020b include silicon-containing materials (e.g., amorphous or polysilicon, and silicon nitride), oxides, and gallium phosphide. Examples of oxides include titanium oxide, zirconium oxide, silicon dioxide, and zinc oxide. In some implementations, the material or combination of materials forming the protrusions 2020a, 2020b is the same, which has advantages for simplifying fabrication of the metasurface 2002.

With continued reference to FIGS. 10A and 10B, in some implementations, one of the protrusions 2020b has a width $NW_2$ that is larger than the width $NW_1$ of the other of the illustrated protrusions 2020a. In some implementations, the widths $NW_1$ and $NW_2$ are each in the range of 10 nm to 1 μm, including 10 nm to 300 nm, with $NW_1$ being greater than $NW_2$ as noted above. As illustrated, the protrusions 2020a, 2020b may be separated by a gap in the range of 10 nm to 1 μm wide, including 10 nm to 300 nm wide. As also illustrated, the protrusions 2020a, 2020b have a height $h_{nw}$, which may be in the range of 10 nm to 1 μm, including 10 nm to 450 nm, in some implementations. Preferably, the heights of the protrusions 2020a, 2020b are substantially equal.

With continued reference to FIGS. 10A and 10B, the metasurface 2002 illustrated in these figures may work in the transmissive mode. Light rays 2021a, 2021b are redirected upon propagating through the metasurface 2002 formed by the protrusions 2020a, 2020b. As illustrated, the light ray 2021a is incident on the metasurface 2002 at an angle α relative to the normal to the surface 2000a. Preferably, the angle α is within the angular bandwidth for the metasurface 2002 such that the light ray 2021a is redirected by the metasurface 2002 to propagate within the substrate 2000 at angles that facilitate total internal reflection within that substrate 2000. As illustrated, the light ray 2021b is redirected such that it makes out an angle $\theta_{TIR}$ with the normal to the surface 2000a. Preferably, the angle $\theta_{TIR}$ is within a range of angles that facilitate total internal reflection within the substrate 2000. As disclosed herein, in some implementations, the metasurface 2002 may be utilized as an in-coupling optical element (e.g., as one or more of the in-coupling optical elements 700, 710, 720 (FIG. 9A)) to in-couple incident light such that the light propagates through the substrate 2000 via total internal reflection.

The metasurface 2002 will also deflect light impinging on it from within the substrate 2000. Taking advantage of this functionality, in some implementations, the metasurfaces disclosed herein may be applied to form out-coupling optical elements, such as one or more of the out-coupling optical elements 570, 580, 590, 600, 610 (FIG. 6) or 800, 810, 820 (FIG. 9B) instead of, or in addition to, forming an in-coupling optical element at different locations on the surface 2000a. Where different waveguides have different associated component colors, it will be appreciated that the out-coupling optical elements and/or the in-coupling optical elements associated with each waveguide made have a geometric size and/or periodicity specific for the wavelengths or colors of light that the waveguide is configured to propagate. Thus, different waveguides may have metasurfaces with different geometric sizes and/or periodicities. As examples, the metasurfaces for in-coupling or out-coupling red, green, or blue light may be have geometric sizes and/or periodicities (pitches) configured to redirect or diffract light at wavelengths of, e.g., 638 nm, 520 nm, and 455 nm, respectively. In some implementations, the geometric size and periodicity of the protrusions 2020a, 2020b and unit cells 2010 increases as wavelengths become longer, and/or the height or thickness of one or both of the protrusions 2020a, 2020b may increase as wavelengths become longer.

In some implementations, where the metasurfaces 2002 are utilized as out-coupling optical elements, the metasurfaces 2002 may have geometric sizes and/or pitches that cause the metasurfaces to impart optical power onto the diffracted light. For example, the metasurfaces may be configured to cause light to exit the metasurface in diverging or converging directions. Different portions of the metasurface may have different pitches, which cause different light rays to deflect in different directions, e.g., so that the light rays diverge or converge.

In some other implementations, the metasurface 2002 may redirect light such that the light propagates away from the metasurface 2002 as collimated rays of light. For example, where collimated light impinges on the metasurface 2002 at similar angles, the metasurface 2002 may have consistent geometric sizes and a consistent pitch across the entirety of the metasurface 2002 to redirect the light at similar angles.

As noted above, while two protrusions 2020a, 2020b are illustrated for ease of discussion, the metasurface 2002 may include unit cells 2010 with one, or with more than two protrusions per unit cell 2010. In addition, the protrusions may have various shapes. In some implementations, the protrusions may be pillars and/or rounded.

Figure 11B:
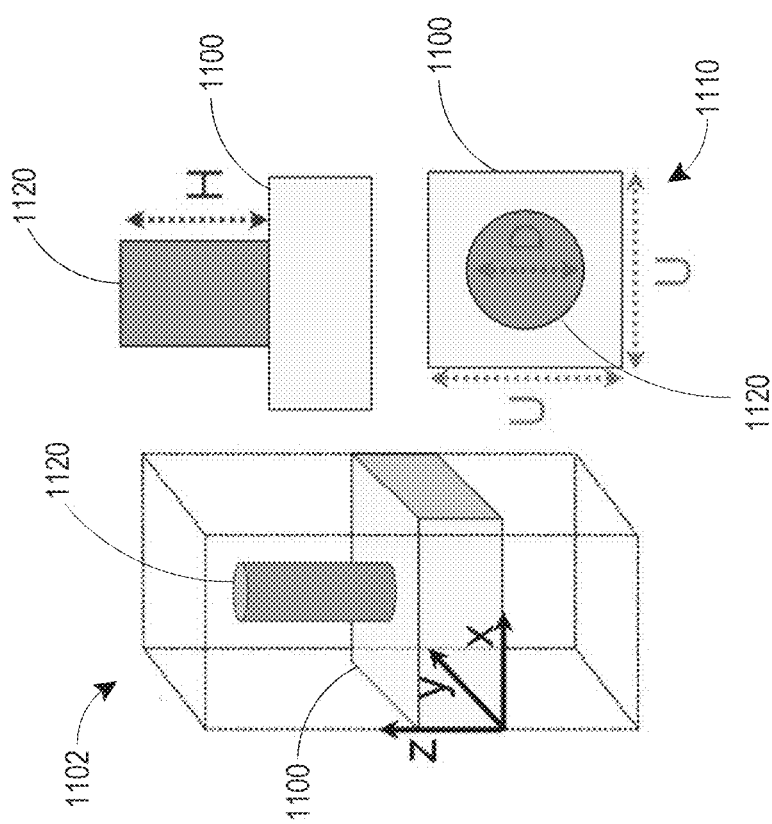
FIG. 11B illustrates an example of a phase map corresponding to a metasurface formed of the pillar structure of FIG. 11A.
Figure 11A:
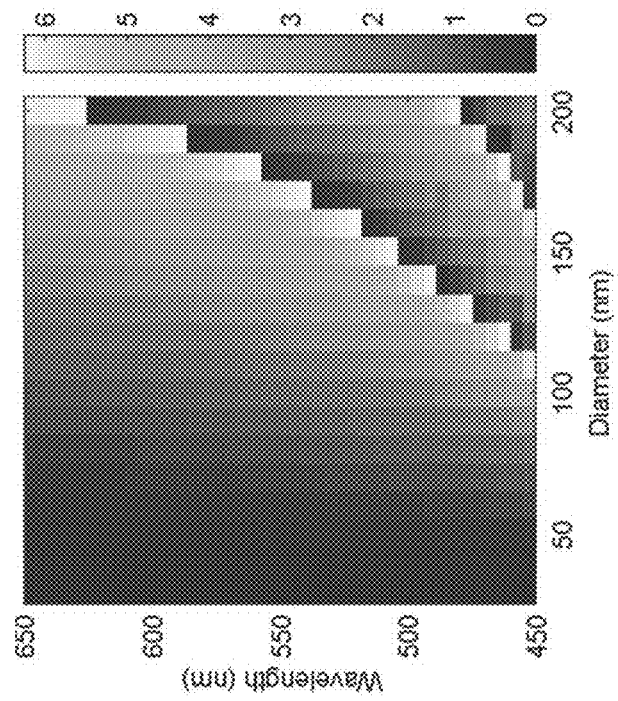
FIG. 11A illustrates an example pillar structure forming some metasurfaces.

With reference to FIGS. 11A-12B, additional metasurface design considerations will be discussed in greater detail. FIG. 11A illustrates a unit cell 1110 of an example metasurface 1102 with substantially cylindrical protrusions, or pillars 1120, formed on a substrate 1100, which may be similar to the substrate 2000 (FIGS. 10A-10B). The metasurface 1102 may include a regular array of unit cells 1110 spaced equally along the x- and y-axes, and/or may include an array of unit cells 1110 having a first spacing along the x-axis and a different spacing along the y-axis. Each pillar 1120 of the metasurface in this example comprises a single material.

Figures 12A, 12B:
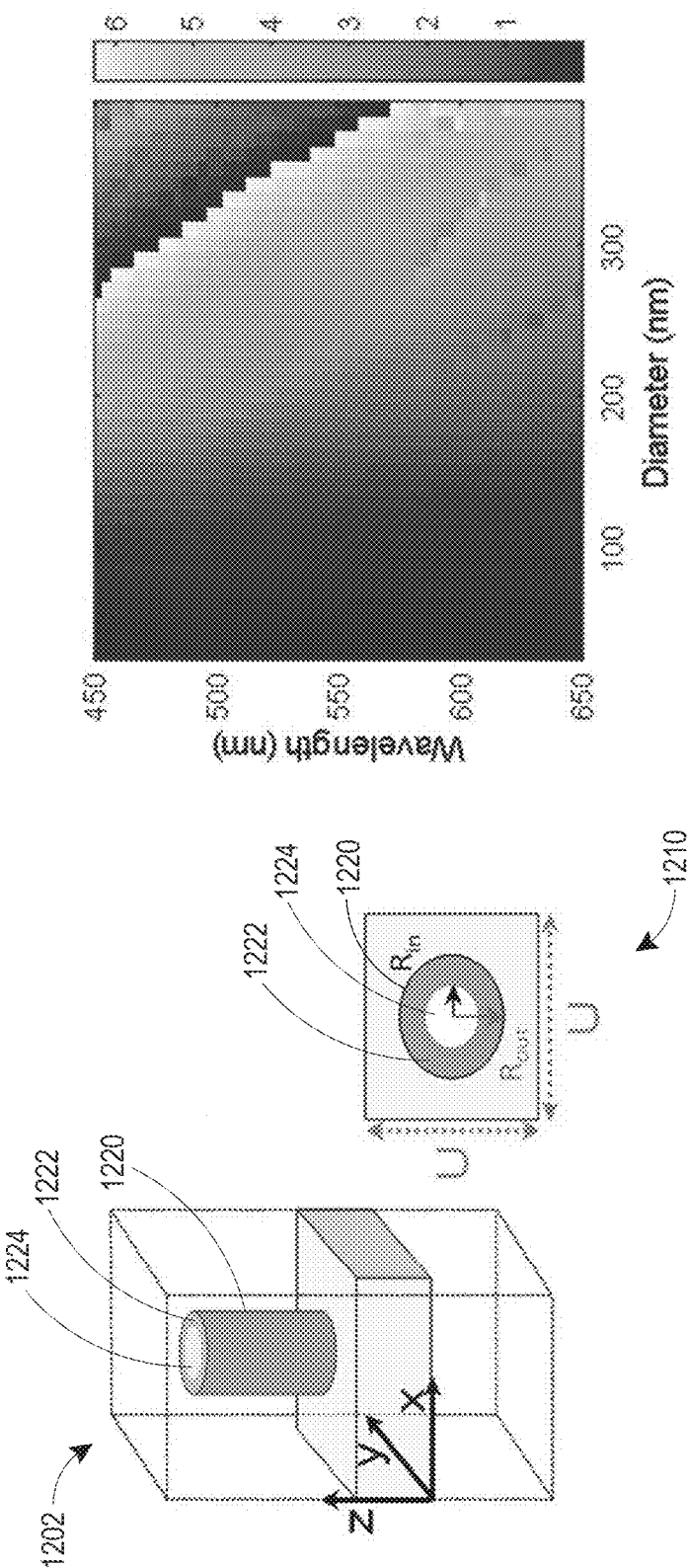
FIG. 12A illustrates an example pillar structure including regions of different materials.
FIG. 12B illustrates an example of a phase map corresponding to a metasurface formed of the pillar structure of FIG. 12A.

FIG. 12A illustrates a unit cell 1210 of an example metasurface 1202 that similarly includes substantially cylindrical structures, or pillar 1220, formed on a substrate 1200, which may be similar to the substrate 2000 (FIGS. 10A-10B). However, the pillars 1220 of metasurface 1202 include an outer layer 1222 comprising a first material and an inner layer 1224 comprising a second material having a different refractive index.

FIGS. 11B and 12B are phase maps illustrating optical properties of example configurations of the metasurfaces 1102 and 1202, respectively. The phase map in FIG. 11B corresponds to a metasurface having cylindrical pillars 1120 comprising titanium dioxide with a height of 600 nm and a unit cell pitch U of 200 nm. The phase map in FIG. 12B corresponds to a metasurface having cylindrical pillars 1220 comprising an outer layer 1222 of titanium dioxide and an inner layer 1224 of air, with a height of 600 nm and a unit cell pitch U of 390 nm. As shown in FIG. 11B, an array of pillars 1120 comprising a single material has relatively few degrees of design freedom, as modifications to the metasurface may be limited to changing the material, diameter, spacing, and height of the pillars 1120, each of which may, e.g., change the resulting wavelength-dependent phase shift of the metasurface.

As shown in FIG. 12B, the phase map corresponding to metasurface 1202 has a substantially different profile from the phase map corresponding to metasurface 1102, due at least in part to the inclusion of an outer layer 1222 and an inner layer 1224 of a material different from the material of the outer layer 1222. Thus, the ability to produce metasurfaces including a plurality of materials in nanostructure (e.g., pillars, nanobeams, etc.) introduces several more degrees of freedom to the metasurface design. For example, these additional degrees of freedom may include the number of layers, the material comprising each layer, and the thickness of each individual layer. Moreover, the layers may be formed by deposition processes which allow precise control of their thicknesses and location. Accordingly, metasurfaces with multi-layer structures as described herein advantageously allow for finer tuning of metasurface performance.

Figure 13:
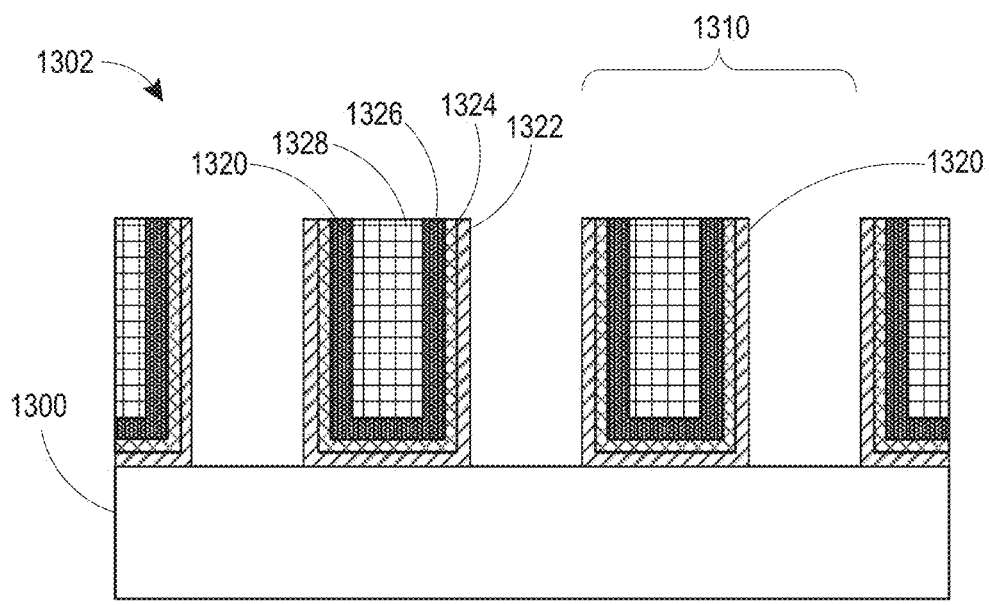
FIG. 13 illustrates an example cross-sectional side view of a metasurface including protrusions with vertically-extending layers of materials.
Figure 14:
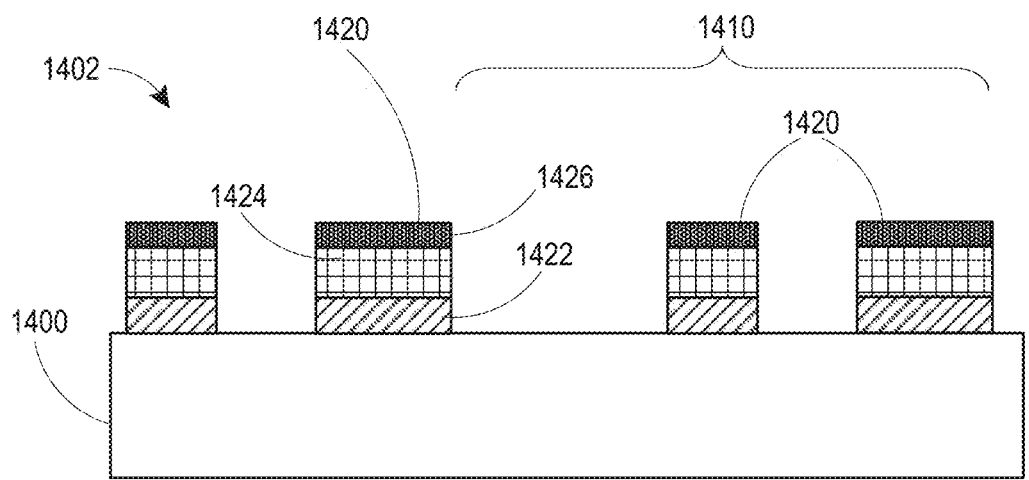
FIG. 14 illustrates an example cross-sectional side view of a metasurface including protrusions with horizontally-oriented layers of materials.

FIGS. 13 and 14 illustrate cross-sectional views of example configurations of multi-layer metasurfaces 1302, 1402. FIG. 13 illustrates a metasurface 1302 with protrusions 1320 formed by a plurality of vertically-oriented portions 1322, 1324, 1326, 1328. In some implementations, the vertically oriented layers 1322, 1324, 1326, 1328 may have concentric u-shaped profiles as seen in a cross-sectional side view; the central portion 1328 may include one or more layers 1322, 1324, 1326, which extend along opposing sidewalls and across a bottom surface of the central portion 3028, such that each of the layers 1322, 1324, 1326 form a u-shaped profile. In some implementations, the protrusions 1320 may have a uniform size and each unit cell 1310 may include a single protrusion 1320. As discussed above, and some other implementations, each unit cell 1310 may include multiple protrusions 1320, with different protrusions within a unit cell having different physical dimensions (e.g., widths). For example, one protrusion 1320 of a unit cell 1310 may be larger than another protrusion of that unit cell (e.g., two protrusions 1320 of the unit cell may correspond to the protrusions 2020a, 2020b (FIGS. 10A-10B)). The protrusions described herein may be formed from one, two, three, or more laminated layers.

FIG. 14 illustrates a metasurface 1402 with unit cells 1410 formed of protrusions 1420, which each include a plurality of horizontally-oriented layers 1422, 1424, 1426. As discussed herein, each unit cell may include one or more protrusions 1420. In some implementations, each unit cell 1310 includes a plurality of protrusions 1420. As illustrated, the unit cells 1410 may include two protrusions 1420 having different widths. The protrusions 1420 may each be formed of a plurality of horizontally-oriented layers 1422, 1424, 1426, which may define a stack of such layers.

With reference to both FIGS. 13 and 14, the protrusions 1320, 1420 may be, for example, nanobeams, pillars having rectangular, circular, or elliptical profiles when viewed from above, or may have other shapes. The spacing between adjacent protrusions 1320 or 1420 may be relatively small, for example, a sub-wavelength spacing (e.g., a nanometer-scale spacing) for visible light (e.g., blue light, green light, red light, etc.). In some implementations, the pitch of the unit cells may be in the range of 10 nm to 1 µm, including 10 nm to 500 nm or 300 nm to 500 nm. Moreover, in some implementations, the thickness of some layers may be relatively small, such as approximately 5 nm or less. It will be understood that either horizontal or vertical layers may be implemented in a unit cell configuration, for example, unit cells comprising a single protrusion or a plurality of protrusions, unit cells comprising evenly sized or differently sized protrusions, unit cells comprising evenly spaced or differently spaced protrusions, etc.

With reference again to FIGS. 13 and 14, the protrusions 1320, 1420 may include a plurality of different materials such as one or more of silicon-containing materials (e.g., amorphous or polysilicon, and silicon nitride), oxides, gallium phosphide, or air (e.g., as the inner, central portion 1328 of protrusions 1320). Examples of oxides include titanium oxide, zirconium oxide, silicon dioxide, and zinc oxide. In some implementations, all layers of each protrusion 1320, 1420 may comprise different materials having different refractive indices. In some other implementations, one or more materials may be repeated or may have the same refractive indices. For example, in the metasurfaces 1302 and 1402, layers 1322 and 1326, 1322 and 1328, 1324 and 1328, or layers 1422 and 1426 may comprise the same material or may have the same refractive index. However, adjacent layers preferably have different refractive indices.

Example methods of manufacturing the metasurfaces 1302 and 1402 will now be described.

FIGS. 15A-15G illustrate an example process of manufacturing a metasurface 1502 including protrusions 1520 (FIG. 15G) having vertically-oriented layers of material. In some implementations, the metasurface 1502 may be similar or identical to the metasurface 1302 of FIG. 13, and the protrusions 1520 may be similar or identical to the protrusions 1320.

Figure 15A:
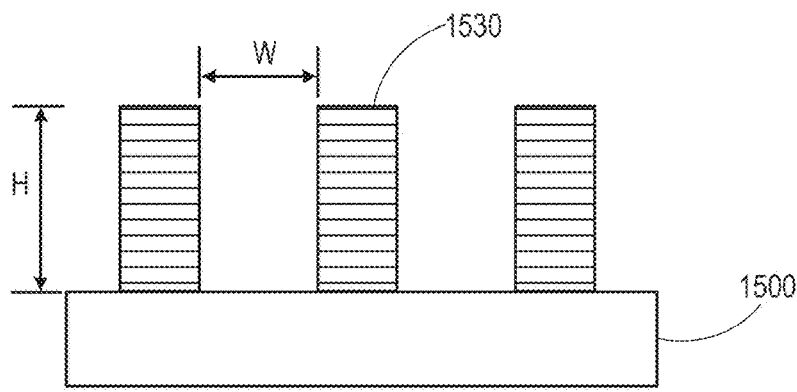
FIGS. 15A-15G are cross-sectional side views illustrating an example of a method of fabricating the metasurface of FIG. 13 with vertically-oriented layers.

With reference to FIG. 15A, a substrate 1500 may be provided to support the formation of the eventual protrusions. The substrate 1500 may be made of, for example, an optically transmissive material such as a glass, a polymer (e.g., a plastic), or the like, and may be similar or identical to the substrates 2000 (FIGS. 10A-10B), 1300 (FIG. 13), or 1400 (FIG. 14). In some implementations, the substrate 1500 may be a waveguide.

With continued reference to FIG. 15A, a plurality of placeholders 1530 are formed having a separation W and a height H. In some implementations, W corresponds to the width of an eventual protrusion 1520 (FIG. 15G), and H is higher than the desired height of the protrusions 1520. The placeholders 1530 may comprise a variety of materials, such as a resist material (e.g., a polymeric resist) or any other suitable material that is selectively etchable relative to the components of the protrusions. The placeholders may be linear structures (e.g., to form nanobeams therebetween), or may be a layer having openings with square, circular, elliptical or other profiles (e.g., to form pillars therebetween). In some implementations, the placeholders 1530 may be formed by depositing a layer of a resist onto the substrate 1500, followed by patterning the resist to form the placeholders 1530 such as by photolithography, electron beam lithography, nanoimprint lithography, or the like.

Figure 15B:
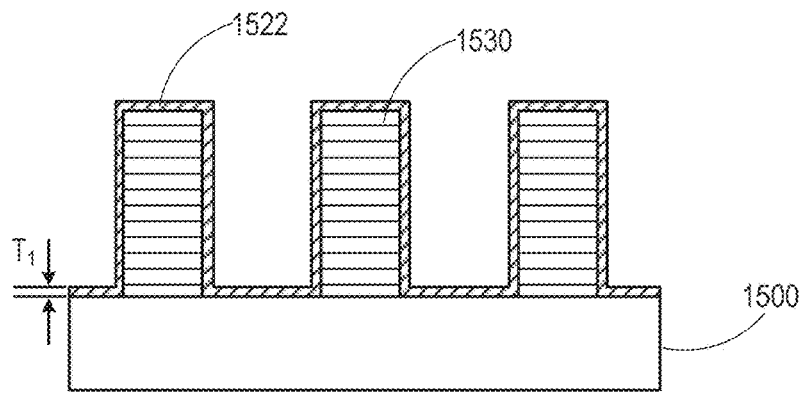

With reference now to FIG. 15B, a first blanket layer 1522 is deposited over the substrate 1500 and placeholders 1530 by a conformal deposition process. Preferably, the first blanket layer 1522 is deposited with a substantially uniform thickness $T_1$. The thickness $T_1$ may be a sub-wavelength thickness, for example, a nanometer-scale thickness. The first blanket layer 1522 may comprise a material that will form the outer layer of the protrusions 1520 of the completed metasurface 1502 (FIG. 15G).

Figure 15C:
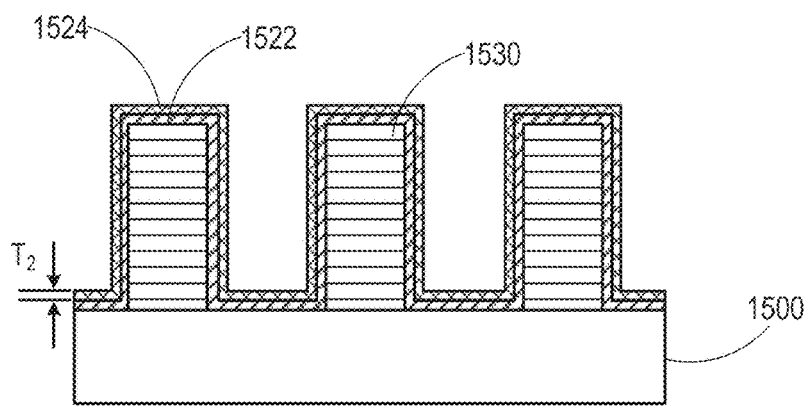

With reference now to FIG. 15C, a second blanket layer 1524 may be deposited over the first blanket layer 1522 (e.g., on and in contact with the first blanket layer 1522). The second blanket layer 1524 may be a different material from the material making up the first blanket layer 1522 and may have a different refractive index. The second blanket layer 1524 may also be deposited by a conformal deposition process, such that the second blanket layer 1524 has a substantially uniform thickness $T_2$. The thickness $T_2$ may similarly be a sub-wavelength thickness, for example, a nanometer-scale thickness.

Figure 15D:
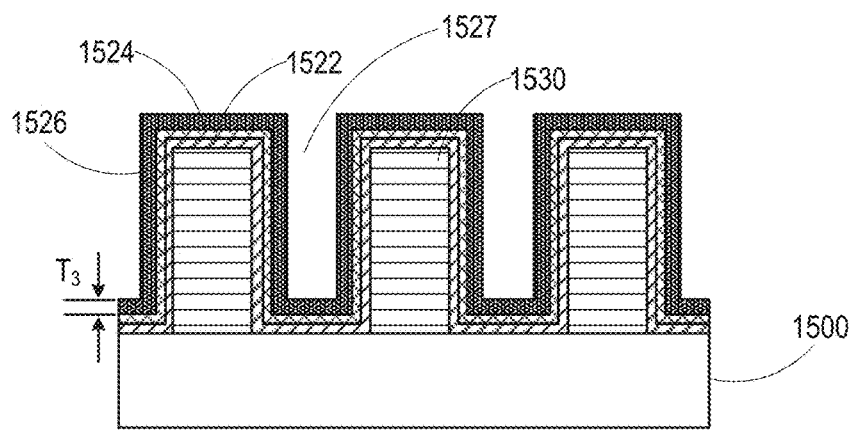

With reference now to FIG. 15D, a third blanket layer 1526 may be conformally deposited over the second blanket layer 1524 at a substantially uniform thickness $T_3$. The third blanket layer 1526 preferably comprises a different material with a different refractive index relative than the material making up the second blanket layer 1524. For example, the third blanket layer may comprise the same material or have the same refractive index as the first blanket layer 1522, or may comprise a material having a different refractive index relative to both the first blanket layer 1522 and the second blanket layer 1524. The thickness $T_3$ may similarly be a sub-wavelength thickness, for example, a nanometer-scale thickness. It will be appreciated that the third blanket layer 1526 may define open volumes 1527.

Figure 15E:
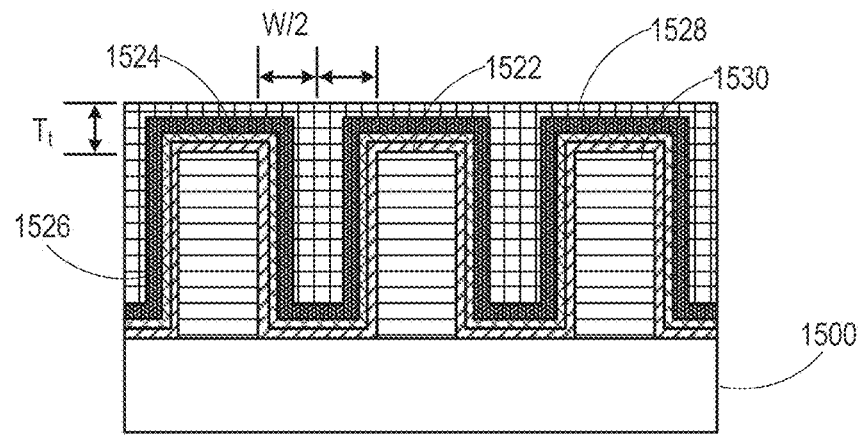

With reference now to FIG. 15E, the open volumes 1527 (FIG. 15D) may be provided with a fill 1528. In some implementations, the fill 1528 may effectively be a fourth layer that is deposited over the third blanket layer 1526 until that fourth layer occupies substantially the entireties of the volumes 1527. In some implementations, the fill 1528 may be deposited by atomic layer deposition. In some other implementations, the fill 1528 is preferably deposited by a relatively fast deposition, e.g., a chemical vapor deposition (CVD) or physical vapor deposition (PVD). After the fill is deposited, the total thickness $T_t$ of all deposited layers (e.g., 1522, 1524, 1526, 1528) is preferably less than half of the width W between placeholders 1530 (e.g., $T_t \leq W/2$). In some embodiments, the fill 1528 is air and no material is affirmatively deposited into the openings 1527.

Figure 15F:
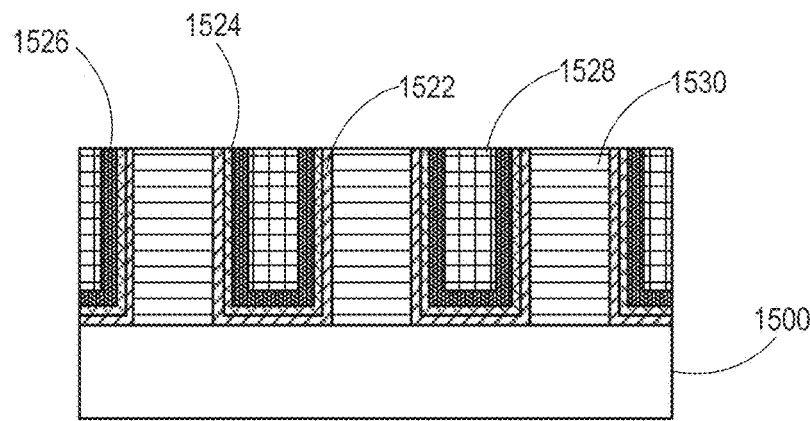
Figure 15G:
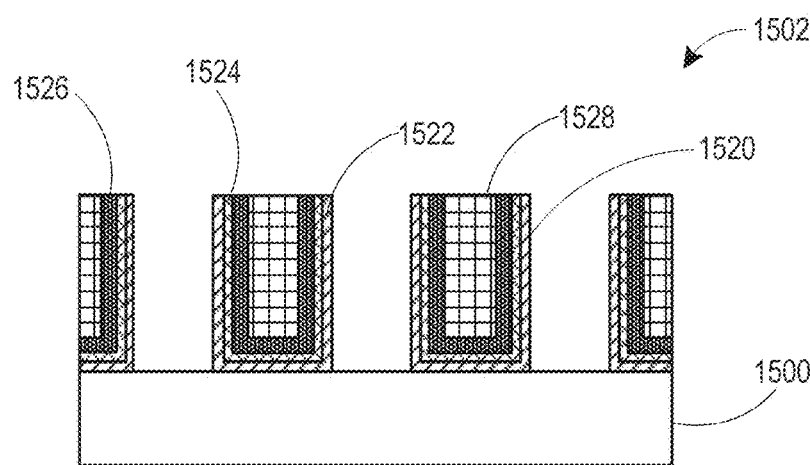

With reference now to FIG. 15F, the horizontally-oriented portions of the layers 1522, 1524, 1526, 1528 disposed above the placeholders 1530 may be removed, e.g., by a process such as chemical mechanical polishing (CMP), etching (e.g., liquid and/or plasma etching), milling, or any other suitable subtractive manufacturing process. In some implementations, a portion of the placeholders 1530 may be removed as well by the subtractive manufacturing process. Preferably, sufficient material is removed such that the entire width of each placeholder is exposed and not covered vertically by any of the layers 1522, 1524, 1526, 1528. In some implementations, the remaining structure may be annealed and/or modified, e.g., to increase its mechanical integrity.

After subtractive manufacturing exposes the placeholders 1530, the placeholders 1530 may be removed to provide the metasurface 1502 depicted in FIG. 15G. As discussed herein, the placeholders 1530 preferably comprise a material that is selectively etchable relative to the materials of the layers 1522, 1524, 1526, 1528. The placeholders 1530 may comprise a material that is removable by wet etching, plasma etching, or similar methods. For example, the placeholders 1530 may comprise a resist material that is soluble in a solvent that does not dissolve the materials of layers 1522, 1524, 1526, and 1528. Accordingly, the solvent may be used to remove the exposed placeholders of FIG. 15F to form the metasurface 1502 of FIG. 15G. In some implementations, one or more layers (e.g., the first layer 1522 or the innermost layer 1528) may be modified (e.g., converted to a different material) by processes such as sulfurization or other ion-exchange methods. In some implementations, it will be appreciated that the protrusions 1520 may substitute for the protrusions 2020a, 2020b of the metasurface 2002 (FIGS. 10A-10B).

With reference again to FIGS. 15B and 15E, it will be appreciated that, in some implementations, the manufacturing method may proceed to filling the volumes 1527 (FIG. 15E) directly after forming the structure of FIG. 15B, without forming additional intervening layers, e.g., the additional layers of FIGS. 15C-15D. In some other implementations, one or more of the additional blanket layers 1524, 1526 (FIGS. 15C and 15D, respectively) may be formed before proceeding to filling the volumes 1527. In yet other implementations, further blanket layers may be deposited after forming the additional blanket layers 1524, 1526 and before proceeding to FIG. 15E.

With reference again to FIGS. 15B-15E, an example of a conformal deposition process for forming the various layers of the protrusions 1520 (e.g., the layer 1522, 1524, 1526) is atomic layer deposition (ALD). Preferably, the layers are deposited with substantially uniform thicknesses, which are substantially uniform along sidewalls and top surfaces of the placeholders 1530, and along the substrate surface between the placeholders 1530. The thicknesses may be sub-wavelength thicknesses, for example, nanometer-scale thicknesses. In some implementations, the thickness may be less than 200 nm, including being in the range of 5 nm to 200 nm, less than 100 nm, 5 nm to 100 nm, 5 nm to 50 nm, 5 nm to 10 nm, 10 nm to 20 nm, 20 nm to 50 nm, 50 nm to 100 nm, or less than 5 nm. In some embodiments, the thicknesses of each of the constituent layers 1520 are substantially equal. In some other embodiments, the thicknesses of at least some of the layers may differ.

Figure 16A:
FIGS. 16A-16F are cross-sectional side views illustrating an example of a method of fabricating the metasurface of FIG. 14 with horizontally-oriented layers.
Figure 16B:
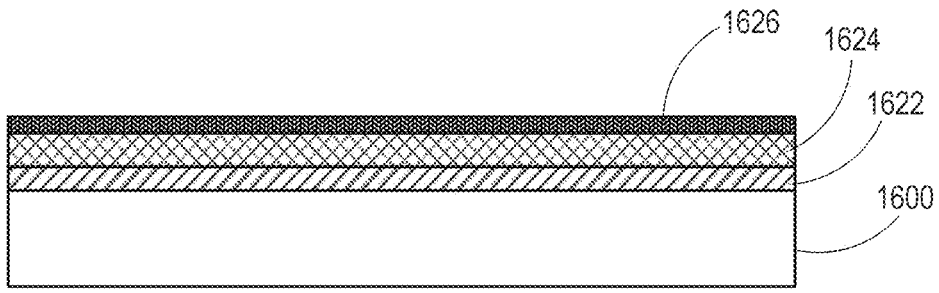
Figure 16C:
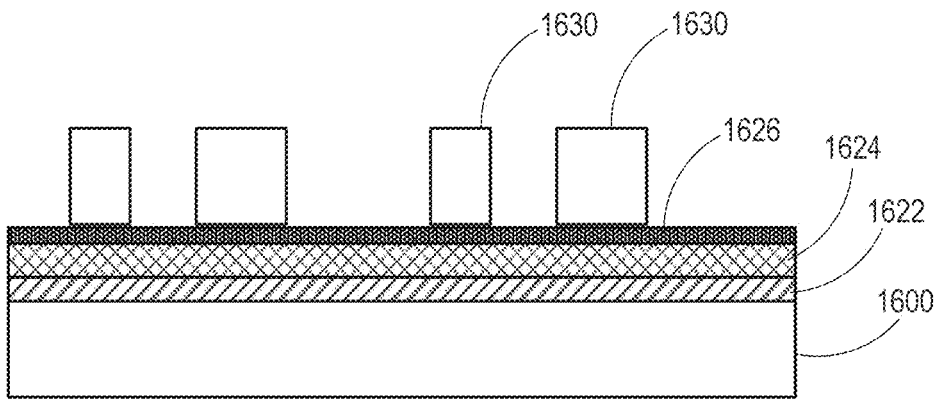
Figure 16D:
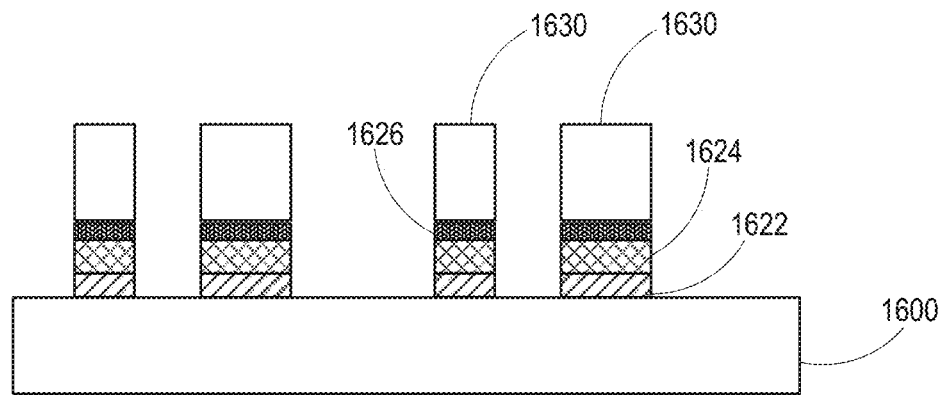
Figure 16E:
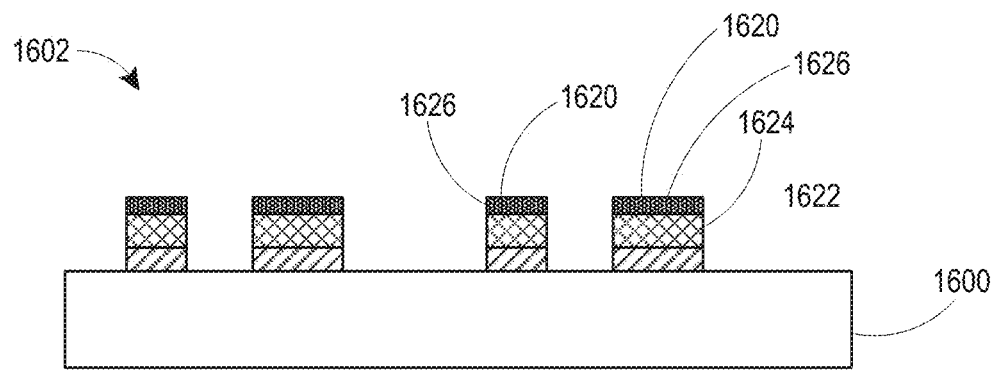
Figure 16F:
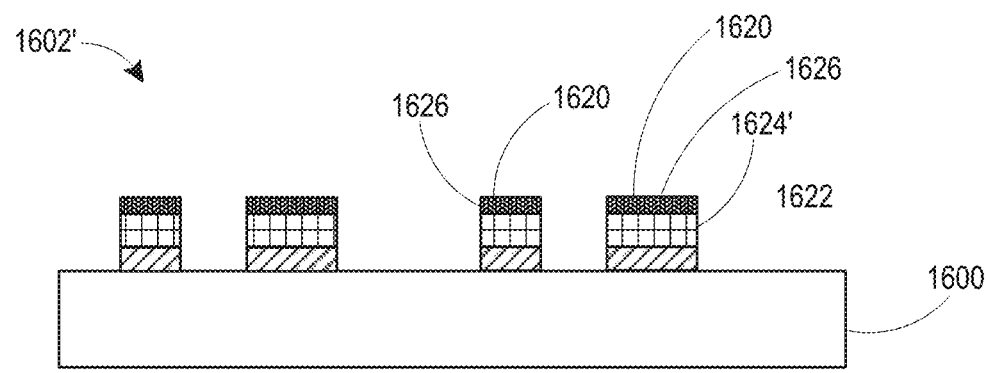

FIGS. 16A-16F illustrate an example process of manufacturing a metasurface 1602 or 1602' including horizontally layered protrusions 1620 (FIG. 16F). In some implementations, the metasurface 1602 may be similar or identical to the metasurface 1402 of FIG. 14.

With reference to FIG. 15A, a substrate 1500 may be provided to support the formation of the eventual protrusions 1620 (FIG. 16F). The substrate 1600 may include, for example, an optically transmissive material such as a glass, a polymer (e.g., a plastic), or the like, and may be similar or identical to the substrates 2000 (FIGS. 10A-10B), 1300 (FIG. 13), or 1400 (FIG. 14). In some implementations, the substrate 1500 may be a waveguide.

With reference now to FIG. 16B, a plurality of blanket layers 1622, 1624, 1626 are sequentially deposited over the substrate 1600. Because the layers may be formed on a flat substrate surface, requirements for conformality may be relaxed relative to the process of FIGS. 15A-15G, and the layers 1622, 1624, 1626 may be deposited by a conformal or non-conformal deposition method. For example, the layers 1622, 1624, 1626 may be deposited by methods such as physical vapor deposition, chemical vapor deposition, atomic layer deposition, or the like. In some implementations, for depositing thin layers (e.g., layers with a thickness of 5 nm to less) and/or where precise control over thickness is desired, the layers 1622, 1624, 1626 may be deposited by ALD. Preferably, the layers 1622, 1624, 1626 blanket an area in which a plurality of protrusions 1620 (FIG. 16F) will be formed.

Although three layers 1622, 1624, 1626 are depicted, it will be understood that the process of FIGS. 16A-16F may include the deposition of more or fewer than three layers. The layers 1622, 1624, 1626 may each be the same thickness or may have different thicknesses. Preferably, each individual blanket layer 1622, 1624, 1626 has substantially the same thickness across its full extent. The thickness of each layer may be a sub-wavelength thickness, for example, a nanometer-scale thickness. In some implementations, one or more blanket layers 1622, 1624, 1626 may each have a thickness of less than 200 nm, including a thickness in the range of 5 nm to 200 nm, less than 100 nm, including 5 nm to 100 nm, 5 nm to 50 nm, 5 nm to 10 nm, 10 nm to 20 nm, 20 nm to 50 nm, or 50 nm to 100 nm. In some implementations, one or more blanket layers 1622, 1624, 1626 may each have a thickness of approximately 5 nm or less. The thickness of each of the blanket layers 1622, 1624, 1626 is selected such that the total thickness of all blanket layers combined is equal to the desired height of protrusions 1620 of the finished metasurface 1602 or 1602' (FIGS. 16E and 16F, respectively). Each blanket layer 1622, 1624, 1626 preferably comprises a material having a different refractive index relative to an immediately adjacent one of the layers 1622, 1624, 1626. In addition, the layer 1622 preferably has a different refractive index than the substrate 1600. In some implementations, layers 1622 and 1626 (or other non-consecutive layers if more than three layers are included) may comprise the same material or may have the same refractive index.

After all desired layers 1622, 1624, 1626 have been deposited over the substrate 1600, the deposited layers may be patterned. With reference now to FIG. 16C, a etch mask may be formed over the top layer 1626 to define the protrusions 1620 (FIG. 16E). It will be appreciated that the etch mask may include a plurality of mask features 1630, which may be formed by depositing one or more layers of selectively-definable material and then patterning that material to define the mask features 1630. The mask features 1630 may comprise any suitable material that is resistant to a subtractive manufacturing process for etching the blanket layers 1622, 1624, 1626. For example, the mask features 1630 may include a resist, a hardmask, or other suitable etch mask material. In some implementations, a layer of resist material may be deposited on the layer 1626 and then patterned, e.g., by photolithography, imprinting, etc. Consequently, in some implementations, the mask features 1630 are resist features.

In some other implementations, a layer of etch mask material is deposited on the layer 1626 and a resist layer is subsequently deposited over the etch mask material. The resist layer is patterned in the pattern of subsequently transferred down to the layer of etch mask material to define the mask features 1630 in the layer of etch mask material.

It will be appreciated that, as seen in a top-down view, the mask features 1630 have a shape corresponding to the desired shape of the protrusions 1620. For example, if the protrusions 1620 of the metasurface 1602 or 1602' will be nanobeams, the mask 1630 may include linear sections having the same width and length as the desired nanobeams in the plane parallel to the substrate 1600. If the protrusions 1620 are pillars, the mask 1630 have the same two-dimensional shape as the desired nanobeams.

After forming the mask features 1630, a subtractive manufacturing method may be applied to remove the portions of the blanket layers 1622, 1624, 1626 that are not covered by the mask 1630, as shown in FIG. 16D. The subtractive manufacturing method used to produce the configuration of FIG. 16D may include directional or non-directional etch processes, for example, wet etching, plasma etching, or the like. After etching the blanket layers 1622, 1624, 1626, the mask features 1630 may be removed (e.g., by applying a solvent to dissolve those features, or by ashing) to form a metasurface 1602 including protrusions 1620 comprising horizontally-oriented layers 1622, 1624, 1626, as shown in FIG. 16E.

In some implementations, the metasurface 1602 of FIG. 16E may be the desired configuration. In some other implementations, one or more of the layers 1622, 1624, 1626 may be modified (e.g., converted to a different material). The modification may include, for example, processes such as sulfurization or selenization, or other ion-exchange processes. For example, the protrusions 1620 may be exposed to an atmosphere comprising a concentration of a chemical that will be incorporated into the appropriate layer. In some implementations, ion-exchange processes may be desirable where the protrusions 1620 are to include a layer of a material that is difficult to deposit by typical deposition methods (and thus undesirable to form as one of layers 1622, 1624, and 1626), but may be formed by ion-exchange from a material that is more easily deposited. In the example metasurface 1602' of FIG. 16F, the middle layer 1624 may be converted to a modified middle layer 1624' by ion-exchange. However, other layers (e.g., layers 1622 and/or 1626) may be modified similarly if desired. For example, one of the layers 1622, 1624, 1626 may be deposited as a molybdenum compound (e.g., molybdenum oxides or the like) and exposed to a sulfurous atmosphere to convert the molybdenum compound to molybdenum sulfide. In some implementations, it will be appreciated that the protrusions 1520 may substitute for the protrusions 2020a, 2020b of the metasurface 2002 (FIGS. 10A-10B).

Various example implementations of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane. In addition, while advantageously applied to metasurfaces, the multi-layer structures and related methods of manufacture disclosed herein may be applied to form other optical structures, including diffractive gratings formed of protrusions which are larger than the wavelengths of visible light.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several implementations without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A method of manufacturing an optical element for redirecting light, the method comprising:
 providing a plurality of spaced-apart placeholders on a waveguide;
 conformally depositing a first blanket layer comprising a first material onto the placeholders and the waveguide;

conformally depositing a second blanket layer onto the first blanket layer, the second blanket layer comprising a second material different from the first material;

conformally depositing a third blanket layer on the second blanket layer, the third blanket layer comprising a third material different from the second material, wherein the first, second, and third blanket layers extend along sidewalls of the placeholders to define open volumes between the placeholders;

filling the open volumes with a fill material;

preferentially removing horizontally-oriented portions of the first, second, and third blanket layers to expose at least a portion of the placeholders; and selectively etching the placeholders to remove at least the exposed portion of the placeholders while retaining the first, second, and third materials and the fill material, to form a plurality of vertically-oriented protrusions configured to redirect light, each of the vertically-oriented protrusions comprising a first vertical layer comprising the first material, a second vertical layer comprising the second material, a third vertical layer comprising the third material, and the fill material.

2. The method of claim 1, wherein the vertically-oriented protrusions form a metasurface, the vertically-oriented protrusions having a spacing less than a wavelength of the light.

3. The method of claim 1, wherein providing the placeholders comprises depositing a layer of a resist on the waveguide and patterning the resist to define the placeholders.

4. The method of claim 3, wherein patterning the resist comprises performing at least one of photolithography, electron beam lithography, and nanoimprint lithography.

5. The method of claim 1, wherein conformally depositing the first, second, and third blanket layers comprises depositing at least one of the first, second, and third blanket layers by atomic layer deposition.

6. The method of claim 1, wherein the fill material has a different refractive index than the first material.

7. The method of claim 1, wherein preferentially removing horizontally-oriented portions comprises performing chemical mechanical polishing.

8. The method of claim 1, further comprising annealing remaining portions of the first, second, and third blanket layers prior to selectively etching the placeholders.

9. The method of claim 1, wherein selectively etching the placeholders comprises at least one of wet etching and plasma etching.

10. The method of claim 1, further comprising modifying the vertically-oriented protrusions to comprise a different material by performing a sulfurization process.

11. The method of claim 1, wherein the third material is the same as the first material.

12. The method of claim 1, wherein the third material is different than the first material.

13. The method of claim 1, wherein filling the open volumes with the fill material comprises depositing the fill material by atomic layer deposition.

14. The method of claim 1, wherein filling the open volumes with the fill material comprises depositing the fill material by at least one of chemical vapor deposition or physical vapor deposition.

* * * * *